United States Patent [19]
Kasai et al.

[11] Patent Number: 5,420,897
[45] Date of Patent: May 30, 1995

[54] FAST REACTOR HAVING REFLECTOR CONTROL SYSTEM

[75] Inventors: Shigeo Kasai, Kamakura; Masatoshi Kawashima; Tsugio Yokoyama, both of Yokohama; Katsutada Aoki, Kamakura; Norihiko Handa, Narashino; Megumu Yoshida, Yokosuka; Morihiko Sato, Yokohama; Hiroshi Nakamura, Hatano; Tohru Iijima, Yokohama; Junko Matsuda, Yokohama; Kenji Ogura, Yokohama; Makoto Ono, Yokosuka; Sadao Hattori, Nagoya, all of Japan

[73] Assignees: Kabushiki Kaisha Toshiba, Kawasaki; Central Research Institute of Electric Power Industry, Tokyo, both of Japan

[21] Appl. No.: 97,833

[22] Filed: Jul. 29, 1993

[30] Foreign Application Priority Data

| Jul. 30, 1992 | [JP] | Japan | 4-203896 |
| Oct. 30, 1992 | [JP] | Japan | 4-293473 |
| Nov. 12, 1992 | [JP] | Japan | 4-302507 |
| Dec. 3, 1992 | [JP] | Japan | 4-324322 |
| Dec. 3, 1992 | [JP] | Japan | 4-324402 |
| Dec. 3, 1992 | [JP] | Japan | 4-324471 |

[51] Int. Cl.⁶ ............................ G21C 7/28
[52] U.S. Cl. .................... 376/220; 376/287; 376/406
[58] Field of Search ............... 376/220, 287, 293, 404, 376/406, 458

[56] References Cited

U.S. PATENT DOCUMENTS

| 4,045,286 | 8/1977 | Blum et al. | 376/404 |
| 4,111,747 | 9/1978 | Eck et al. | 376/287 |
| 5,196,159 | 3/1993 | Kawashima et al. | 376/458 |
| 5,299,242 | 3/1994 | Jacox et al. | 376/223 |

OTHER PUBLICATIONS

Abstract for Japanese Patent Publication No. 04-081694, Mar. 16, 1992.

Primary Examiner—Daniel D. Wasil
Attorney, Agent, or Firm—Foley & Lardner

[57] ABSTRACT

A fast reactor comprises a core composed of nuclear fuel, a core barrel surrounding an outer periphery of the core, an annular reflector surrounding an outer periphery of the core barrel, a partition wall structure surrounding an outer periphery of the annular reflector and supporting the core barrel by a supporting structure arranged radially of the fast reactor, the partition wall structure constituting an inner wall of a coolant passage for a primary coolant, a neutron shield surrounding an outer periphery of the partition wall structure and disposed in the coolant passage, a reactor vessel surrounding an outer periphery of the neutron shield and having an inner wall constituting an outer wall of the coolant passage, and a guard vessel surrounding an outer periphery of the reactor vessel.

25 Claims, 35 Drawing Sheets

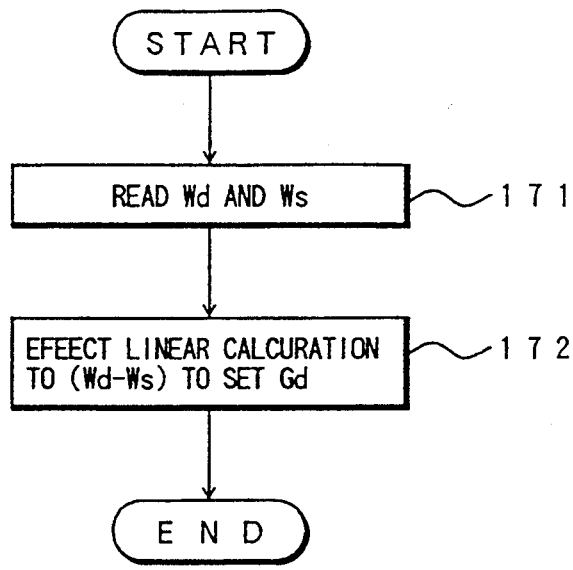
F I G. 20
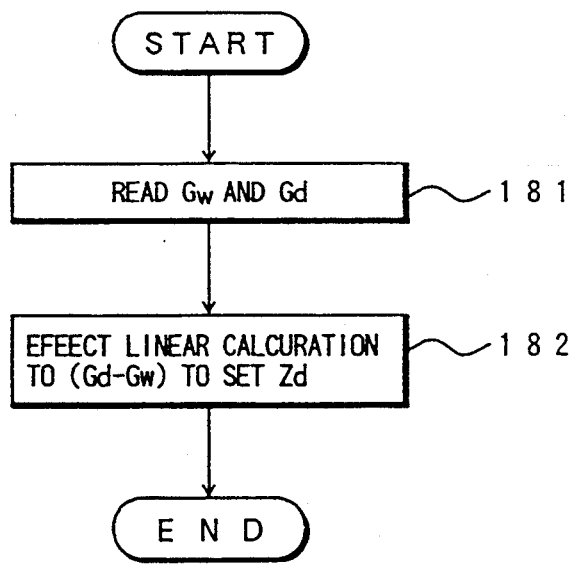
F I G. 21

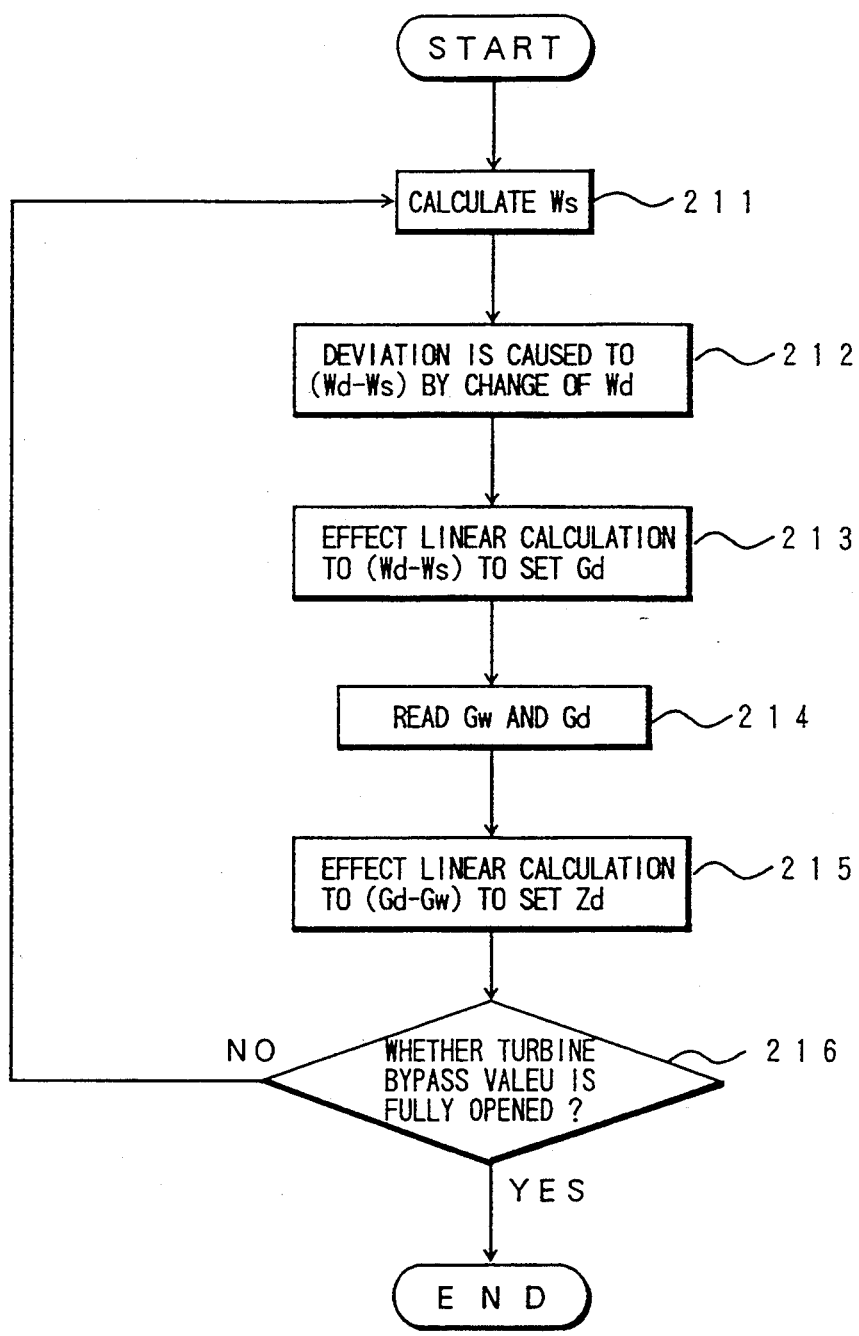
F I G. 25

FAST REACTOR HAVING REFLECTOR CONTROL SYSTEM

BACKGROUND OF THE INVENTION

The present invention relates to a fast reactor, and more particularly, to a fast reactor having a reflector control system for controlling a reactivity of a core by utilizing a neutron reflector.

One example of conventional fast breeder reactor is shown in FIG. 47. Referring to FIG. 47, a fast breeder reactor 10 is provided with a columnar core 11 which is supported by a core barrel 12 disposed outside the core 11 and a reactor vessel 13 is disposed further outside the core barrel 12. A guard vessel 14 for protecting the reactor vessel 13 is disposed outside the reactor vessel 13 and a reflector 15 is disposed further outside the guard vessel 14. A coolant passage 16 through which a primary coolant flows downward is formed between the core barrel 12 and the reactor vessel 13. An electromagnetic pump 17 is disposed perpendicularly above the core, and an intermediate heat exchanger 18 and a decay heat removal coil 19 are disposed further above the electromagnetic pump 17.

In the actual operation of the fast breeder reactor 10 of FIG. 47, the primary coolant such as liquid sodium fills the reactor pressure vessel 13 and plutonium in the core is then fissioned. This core 11 contains plutonium and depleted uranium, and heat is generated in accordance with the fission of the plutonium, thereby emitting neutrons. The emitted neutrons are reflected by the reflector disposed so as to surround the outer periphery of the guard vessel 14 and are then absorbed by the depleted uranium to thereby produce plutonium. The thus produced plutonium is again fissioned and the heat is generated.

In accordance with burn-up of the core, the reflector 15 is relatively vertically moved while maintaining a critical state of the core 11, whereby the burn-up gradually progresses and generates the heat for a long time.

The primary coolant moves upward in the reactor vessel 13 as shown by solid arrow in FIG. 47 by the actuation of the electromagnetic pump 17, decends in the coolant passage 16 through the intermediate heat exchanger 18 and then again flows in the electromagentic pump 17 through the core 11. The primary coolant passes the core 11 while absorbing the heat generated in the core 11 and the heat is transferred to the intermediate heat exchanger 18. A secondary coolant flows into the intermediate heat exchanger 18 through an inlet tube 20 as shown by broken arrow in FIG. 47 and, in the intermediate heat exchanger 18, the heat exchanging operation is carried out between the primary coolant and the secondary coolant. The heat from the core 11 is taken outside the reactor vessel 13 through an outlet tube 21, which is then utilized as a power source.

However, in the conventional fast breeder reactor 10 of the structure shown in FIG. 47, since there is not provided a neutron shield in the reactor vessel and the reflector is disposed outside the reactor vessel, the reactor vessel and the reflector diffuse a large amount of heat inside a shielding structure accommodating the fast breeder reactor. In order to remove this heat, the shielding structure of the conventional fast breeder reactor must be provided with a cooling equipment having large capacity, thus providing a significant problem.

Furthermore, since the conventional fast breeder reactor radiates a large amount of neutrons outside the reactor vessel and gas such as argon and nitrogen in an atmosphere in the shielding structure is activated, it is necessary to provide the activated gas containment vessel for preventing the gas from discharging externally in an environment under severe management, resulting in further enlargement of an entire reactor arrangement, thus also providing a problem.

Still furthermore, in the conventional fast breeder reactor, since a neutron irradiation amount to the reactor vessel during a life time of the reactor exceeds $10^{23}$ nvt (E>0, 1 MeV), stainless steel is not used and expensive crominium steel is to be used, thus also providing an economical problem.

Still furthermore, in the conventional fast breeder reactor, since the electromagnetic pump is disposed directly above the core, a large thermal strain is caused to the electromagnetic pump by the heat of the liquid sodium highly heated by the core and the life time for maintaining required reliability is then shortened, and accordingly, in the conventional fast breeder reactor, the shortening of the life time of the electromagnetic pump adversely affects the life time of a small sized fast breeder reactor itself.

Still furthermore, in the conventional fast breeder reactor, since the intermediate heat exchanger as well as the electromagnetic pump is disposed directly above the core, it is necessary to disassemble and remove the electromagnetic pump and the intermediate heat exchanger at a fuel exchanging time, resulting in a complicated and troublesome disassembling and removing working and a possibility of giving accidental damage to these elements is also increased.

Still furthermore, in the conventional fast reactor having a reflector moving structure, in order to enhance a controlling ability of the neutron reflector, it is obliged to elongate the length of the neutron reflector itself. However, the elongation of the neutron reflector increases its weight, and moreover, affects the core structure itself, and accordingly, it is not desired to elongate the length of the neutron reflector in various view points. Particularly, in so-called a incore reflector type fast reactor in which the neutron reflector is arranged in the reactor vessel, it is difficult to use an elongated neutron reflector from the view point of the incore structure, thus remarkably providing the above problem.

FIG. 48 is an illustration showing a structure of a conventional nuclear power plant 30 including a control system therefor. Referring to FIG. 48, a core 32 is accommodated in a reactor 31 and the core 32 generates heat through a fission chain reaction and heats a primary coolant passing the core. The heated primary coolant is fed into an intermediate heat exchanger 34 through a primary coolant high temperature side line 33 and, in the intermediate heat exchanger 34, heat exchanging operation is performed between the primary coolant and a secondary coolant to transfer the heat to the secondary coolant. After the heat exchanging operation, the primary coolant having the lowered temperature is again circulated into the reactor 31 through a primary coolant low temperature side line 35. Such circulation of the primary coolant is carried out by means of a coolant circulation pump 36.

The secondary coolant having a raised temperature through the heat exchanging operation is transferred to a steam generator 38 as a load heat exchanger through a secondary coolant high temperature side line 37 and heats a water in the steam generator 38. The secondary coolant having temperature lowered in the steam generator 38 is circulated into the intermediate heat exchanger 34 through a secondary coolant low temperature side line 39. Such circulation of the secondary coolant is performed by means of a secondary coolant circulation pump 40.

The water heated through the heat exchanging operation in the steam generator 38 changes to a steam, which is fed to a turbine 42 and drives the same to thereby generate power. The water is fed to the steam generator 38 by means of a water feed pump 43 through a water feed line 57 and feed water flow rate Gw is regulated by a feed water flow rate regulating valve 44.

Power control in the conventional nuclear power plant 30 is performed in the following manner.

The control system of the nuclear power plant 30 comprises a power setter 45 for setting a power, a reactor power control unit 47 for controlling a control rod 46, a primary coolant flow rate regulator 48 for regulating the flow rate of the primary coolant, a secondary coolant flow rate ragulator 49 for regulating the flow rate of the secondary coolant, and a feed water flow rate regulator 50 for regulating the feed water flow rate Gw to the steam generator 38.

The reactor power control unit 47 operates and processes a driving speed of the control rod in response to a power setting signal from the power setter 45, with a reactor outlet temperature detected by a temperature detector 51 being as a feddback signal and a neutron flux level detected by the neutron detector 51 being an auxiliary signal, and then controls the vertical movement of insertion or withdrawal of the control rod 46 in accordance with the operated and processed result. The power of the reactor 31 is regulated by vertically moving the control rod 46.

The primary coolant flow rate regulator 48 controls the revolution number of the primary coolant circulation pump 36 in response to the power setting signal form the power setter 45 with the flow rate of the primary coolant detected by the primary coolant flow rate detector 53 being a feedback signal. The flow rate of the primary coolant is regulated by changing the revolution number of the primary coolant circulation pump 36.

The secondary coolant flow rate regulator 49 controls the revolution number of the secondary coolant circulation pump 40 in response to the power setting signal from the power setter 45 with the flow rate of the secondary coolant detected by the secondary coolant flow rate detector 54 being as a feedback signal. The flow rate of the primary coolant is regulated by changing the revolution number of the primary coolant circulation pump 40.

The feed water flow rate regulator 50 controls an opening degree of the feed water regulating valve 44 in response to the power setting signal from the power setter 45 with the feed water flow rate detected by the feed water flow rate detector 55 being as a feedback signal and a steam temperature detected by the steam temperature detector 56 being as an auxiliary signal. The feed water flow rate to the steam generator 38 is regulated by changing the opening degree of the feed water flow rate regulating valve.

As described above, in the conventional nuclear power plant 30, the inserting, i.e. charging, amount or degree of the control rod 46, the flow rates of the primary and secondary coolants and the feed water flow rate to the steam generator 38 are set by the power setter 45, and in order to maintain the set values regarding these factors, the power setter 45, the reactor power control unit 47, the primary coolant flow rate regulator 48, the secondary coolant flow rate regulator 49 and the feed water flow rate regulator 50 are operated, thereby maintaining the value of the aimed power.

However, the control system of the conventional nuclear power plant is composed of the power setter, the reactor power control unit, the primary coolant flow rate regulator, the secondary coolant flow rate regulator and the feed water flow rate regulator, thus being complicated in its structure. Furthermore, since the reactor power control unit directly operates the control rod, there is a fear of erroneously withdrawing the control rod due to a failure of the reactor power control unit itself. This problem has been commonly considered to the case of a fast breeder reactor in which the power is roughly adjusted by driving the reflector and a fear resides in an erroneous operation of the reflector.

SUMMARY OF THE INVENTION

A primary object of the present invention is to substantially eliminate defects or drawbacks encountered in the prior art and to provide a fast reactor of small size capable of less diffusing heat and neutrons externally of a reactor, which are absorbed by a shielding structure having a simple construction and a cooling equipment, and capable of effectively utilizing the heat.

Another object of the present invention is to provide a neutron driving structure capable of enhancing a reactivity controlling ability of a neutron reflector without elongating the reflector itself.

A further object of the present invention is to provide a nuclear power plant having a compact structure capable of eliminating the problems encountered in the prior art as described above and capable of finely adjusting the power of the power plant by roughly adjusting the power by driving the reflector with a constant speed and regulating the feed water flow rate to the steam generator.

These and other objects can be achieved according to the present invention by providing, in one aspect, a fast reactor characterized by comprising a core composed of nuclear fuel, a core barrel surrounding an outer periphery of the core, an annular reflector surrounding an outer periphery of the core barrel, a partition wall surrounding an outer periphery of the annular reflector and supporting the core barrel by a supporting structure arranged radially of the fast reactor, the partition wall constituting an inner wall of a coolant passage for a primary coolant, a neutron shield surrounding an outer periphery of the partition wall and disposed in the coolant passage, a reactor vessel surrounding an outer periphery of the neutron shield and having an inner wall constituting an outer wall of the coolant passage, and a guard vessel surrounding an outer periphery of the reactor vessel.

Further, for achieving the above objects, the reactor of the present invention of the reflector control type, in which the reactivity of the core is controlled by adjusting leakage of neutrons from the core by vertically moving the neutron reflector arranged outside the core of the reactor immersed in the coolant, is characterized in that the periphery of the core positioned above the neutron reflector is surrounded by a substance having a neutron reflecting ability lower than that of the coolant.

Furthermore, for achieving the above objects, the nuclear plant of the present invention includes a neutron reflector disposed in the fast reactor and driven with a constant speed to maintain a burn-up in the core by changing a burn-up range of the core for roughly adjusting a thermal power of the fast reactor, and a plant control unit for changing a temperature of the primary coolant at an inlet of the fast reactor by adjusting a feed water flow rate of the steam generator and finely adjusting the thermal power of the fast reactor in accordance with a temperature feedback effect. The plant control unit comprises: a thermal power calculation section for calculating a thermal power of the steam generator in response to inputted steam temperature at an outlet portion of the steam generator, steam pressure at the outlet portion thereof and steam flow rate; a thermal power control section for comparing the thermal power calculated by the thermal power calculation section with a set value of the thermal power of the steam generator and setting a feed water flow rate signal; and a flow rate control section detecting a feed water flow rate, comparing the detected feed water flow rate with the feed water flow rate signal set by the thermal power control section and setting a signal relating an opening degree of a feed water flow rate regulating valve to thereby control the feed water flow rate.

According to the fast reactor of the present invention, since the reflector is disposed closely to the outer periphery of the core, the neutrons are effectively reflected and the burn-up and the breeding of the nuclear fuel can be hence effectively performed. Further, since the reflector is itself immersed in the primary coolant, the heat generated by the reflector is utilized as a power of the fast reactor, thus improving the running efficiency of the reactor.

Next, since the neutron shield of the fast reactor of the present invention is disposed inside the reactor vessel and in the coolant passage, the heat generated by the neutron shield can be utilized as a power of the reactor and less amount of the neutrons is irradiated in and out of the reactor vessel. Accordingly, the irradiation of the neutrons to the reactor vessel can be reduced, whereby the reactor vessel can be formed of a stainless steel being a cheap material, thus achieving an economical advantage. Moreover, sealing requirement for the shield structure containing the fast reactor and the heating of the cooling equipment associated with the shield structure and a radiated air in the shield structure can be alleviated, thus making compact the shield structure and the cooling equipment.

Still furthermore, according to the present invention, since the core disposed above the neutron reflector is surrounded by a substance having a neutron reflecting ability lower than that of the coolant, at the beginning of life (BOL) at which the neutron reflector is positioned below the reflector, the periphery of the core is covered by that substance to suppress, to a lower value, the reactivity in comparison with a conventional structure in which the entire surface of the core is covered by the coolant, thus enhancing the enrichment of the fuel. Further, in the case where the neutron reflector is moved upward, the reactivity is increased by the change of the relative positions of the neutron reflector and the core and the range surrounded by the coolant is gradually widened while reducing the range surrounded by that substance, whereby the reactivity due to the difference of the neutron reflecting abilities of both portions displaced between that substance and the coolant.

Still furthermore, according to the nuclear plant according to the present invention, since the reflector of the fast reactor is driven at a predetermined speed, the control unit for the control rod or the reflector, which is required for the conventional structure, can be eliminated, and moreover, the power of the fast reactor can be roughly controlled by the reflector, thus preventing the reflector from erroneously operating on a failure of the reflector control device.

Still furthermore, according to the nuclear plant of the present invention, the actual power of the steam generator is calculated by the plant control unit in accordance with the steam temperature, the steam pressure and the steam flow rate and the difference between the set power value of the power plant and the feed water flow rate to the steam generator is also calculated thereby, thus controlling the feed water flow rate to the steam generator. According to the control of the feed water flow rate to the steam generator, the power of the fast reactor can be controlled by the temperature feedback effect.

Namely, in a case where an actual power of the power plant is larger than the set value, the feed water flow rate to the steam generator is reduced, and accordingly, the temperature of the primary coolant at the inlet port of the reactor is increased through the secondary coolant, the intermediate heat exchanger and the primary coolant, resulting in the lowering of the fission chain reaction in the core and hence decreasing the power of the reactor. On the contrary, in a case where the actural power is smaller than the set value, the feed water flow rate is increased, and accordingly, the temperature of the primary coolant at the inlet port of the reactor is decreased through the secondary coolant, the intermediate heat exchanger and the primary coolant, resulting in the increasing of the activation of the fission chain reaction in the core and hence increasing the power of the reactor. According to this temperature feedback effect, the plant control unit can finely adjust the power of the fast reactor.

The nature and further features of the present invention will be made more clear hereunder through descriptions of preferred embodiments with reference to the accompanying drawings.

BRIEF DESCRIPTION OF THE DRAWINGS

In the accompanying drawings:

FIG. 20 is a flowchart showing a process flow in a thermal power control section;

FIG. 21 is a flowchart showing a process flow of a flow rate control section;

FIG. 25 is a flowchart showing a generator load follow-up control flow of the nuclear power plant of the embodiment of FIG. 22;

DESCRIPTION OF THE PREFERRED EMBODIMENTS

Figure 1:
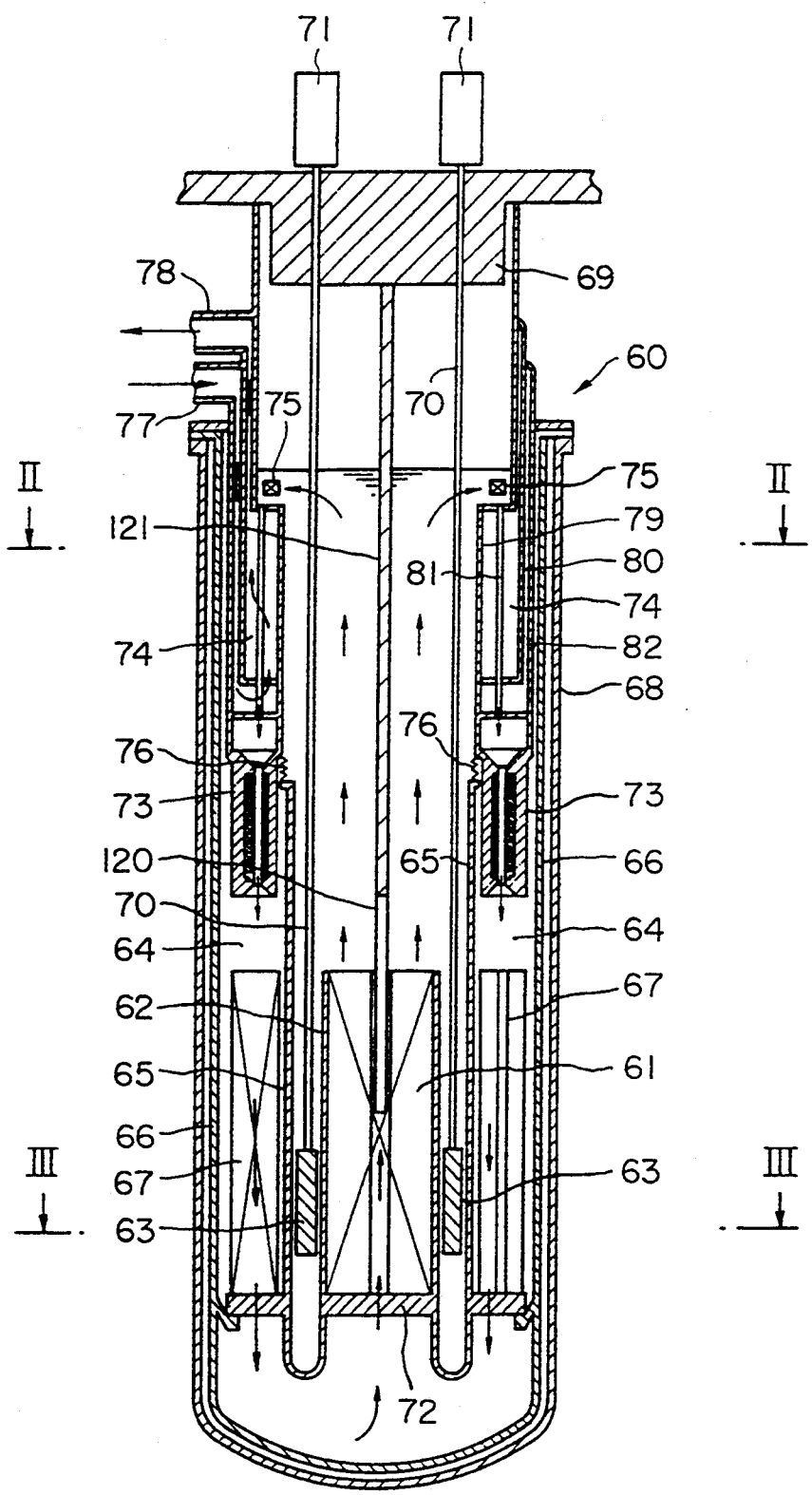
FIG. 1 is an axial, i.e. elevational, section of a first embodiment of a fast reactor of the present invention.

FIG. 1 shows a structure of a fast reactor according to one embodiment of the present invention. The fast reactor 60, shown in FIG. 1, is provided with a core 61 composed of fuel assemblies packed with nuclear fuels and the core 61 has a substantially columnar shape in an entire structure. The outer periphery of the core 61 is surrounded by a core barrel 62 for protecting the same and an annular reflector 63 is disposed outside the core barrel 62 so as to surround the same. A partition wall structure 65 is disposed outside the reflector 63 so as to surround the reflector 63 and to define an inner wall of a coolant passage 64 for a primary coolant. An outer wall of the coolant passage 64 is defined by a reactor vessel 66 outside the partition wall structure 65. A neutron shield 67 is disposed in the coolant passage 64 so as to surround the core 61. The outside of the reactor vessel 66 is guarded by a guard vessel 68.

The reflector 63 is suspended by a plurality of driving shafts 70 penetrating an upper plug 69 to be vertically movable by means of a reflector driving mechanism 71.

The partition wall structure 65 extends upwards, as viewed, from a base plate 72 on which the core 61 is mounted and forms the annular coolant passage 64 between it and the reactor vessel 66. The neutron shield 67 is disposed below this coolant passage 64 as mentioned above. An annular electromagnetic pump 73 is arranged in the coolant passage 64 above the neutron shield 67 and an intermediate heat exchanger 74 is arranged further above the electromagnetic pump 73. A decay heat removal coil means 75 is disposed further above the intermediate heat exchanger 74.

The electromagnetic pump 73 and the intermediate heat exchanger 74 are composed integrally with each other and the integral structure is further integrally and continuously formed with the upper structure of the reactor. As shown in FIG. 1, the intermediate heat exchanger 74 has a tube side through which the primary coolant passes and a shell side through which the secondary coolant passes. A seal bellows 76 is disposed between the lower end of the integral structure of the electromagnetic pump 73 and the intermediate heat exchanger 74 and the upper end of the partition wall structure 65 for absorbing expansion or contraction of a small sized fast reactor due to the heat and defining the coolant passage 64.

The reactor of FIG. 1 uses a nuclear fuel containing plutonium for the core 61. In the actual operation of the reactor, the plutonium is fissioned and generates heat, and simultaneously, excessed fast neutrons are absorbed by a depleted uranium, thus producing plutonium of an amount more than that to be burned up. The reflector 63 reflects the neutrons irradiated from the core 61 to thereby facilitate burn-up and breeding of the nuclear fuel in the core 61.

The reflector 63 is gradually moved vertically in accordance with the progress of the burn-up of the fuel with the criticality of the fuel maintained, and accordingly, a new portion of the fuel in the core 61 is then gradually burned up, thus keeping the burn-up for a long time.

In the actual operation, liquid sodium as the primary coolant is filled up in the reactor vessel 66, and the heat generated in the core 61 is taken out externally while cooling the core 61 by the primary coolant.

The primary coolant flows in the following fashion.

Solid line arrows in FIG. 1 represent the flow direction of the primary coolant, and as shown by these arrows, the primary coolant moves downward by the actuation of the electromagnetic pump 73 to the bottom of the reactor vessel 66 through the inside of the neutron shield 67. Next, the primary coolant passes the inside of the core 61 upward and enters into the tube side of the intermediate heat exchanger 74 at the upper portion of the reactor vessel 66. The primary coolant performs the heat exchanging operation with the secondary coolant in the intermediate heat exchanger 74, then flows outward and is further moved downward by the operation of the electromagnetic pump 73.

The secondary coolant flows into the shell side of the intermediate heat exchanger 74 through an inlet nozzle 77 and is heated by the primary coolant through the heat exchanging operation. Thereafter, the secondary coolant is flown out from the intermediate heat exchanger 74 through an outlet nozzle 78 and the heat of the secondary coolant is then converted to a dynamic power for other use.

Figure 2:
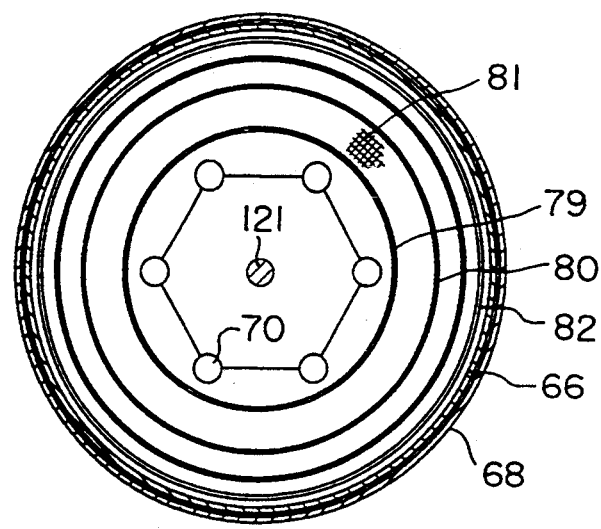
FIG. 2 is a cross sectional view taken along the line II—II of FIG. 1.

Referring to FIG. 2, it will be found that six driving shafts 70, in this embodiment, are arranged with equal distances from the central portion of the driving shaft arrangement. Inner and outer shells 79 and 80 of the intermediate heat exchanger 74 are positioned outside the driving shafts 70, and heat transfer tubes 81 are disposed between these inner and outer shells 79 and 80. The intermediate heat exchanger 74 and the electromagnetic pump 73 are both integrally suspended by an outer shroud 82.

As can be seen from FIGS. 1 and 2, in this embodiment, the intermediate heat exchanger 74 has an annular configuration and the reflector 63 and the driving shafts 70 are arranged inside the intermediate heat exchanger 74 in which the driving shafts 70 are arranged at portions apart from the central portion so as not to be interferred with the core 61. Namely, the upper portion of the core 61 in the reactor vessel 66 is a vacant space, and accordingly, the core 61 can be exchanged for an inspection or other purpose without removing the electromagnetic pump 73 and the intermediate heat exchanger 74.

Figure 3:
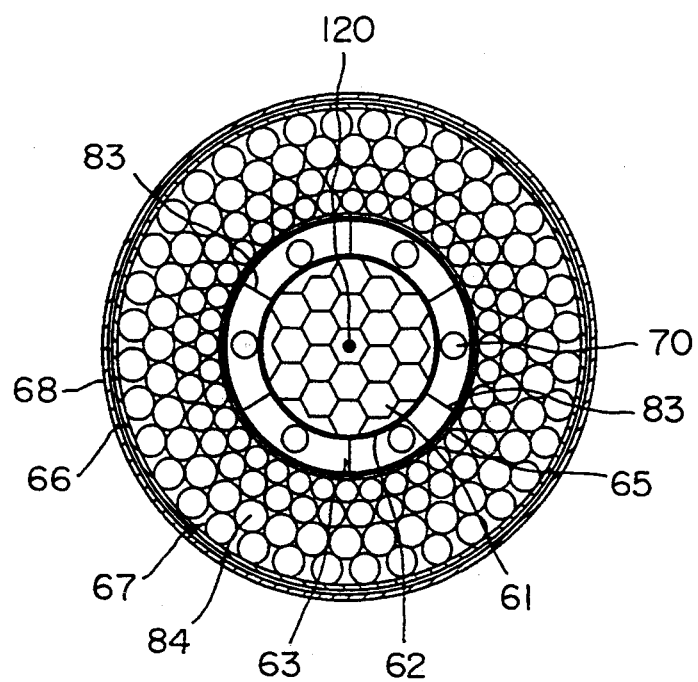
FIG. 3 is a cross sectional view taken along the line III—III of FIG. 1.

FIG. 3 shows the cross sectional view of the fast reactor of FIG. 1 taken along the line III—III, and referring to FIG. 3, the core 61 has an entirely circular cross section and the core barrel 62 is disposed outside the core 61. The annular reflector 63 is further disposed outside the core barrel 62 and suspended by the driving shafts 70. The partition wall structure 65 is arranged outside the reflector 63 and a plurality of ribs 83 are provided to the inside portion of the partition wall structure 65 so as to project radially inward of the fast reactor 60. These ribs 83 penetrate the reflector 63 and support the outer peripheral portion of the core barrel 63 at their distal end portions. The reflector 63 is divided into six sections as shown which are suspended by the driving shafts 70, respectively, to be vertically movable without being interferred with the ribs 83.

As shown in FIG. 3, the neutron shield 67 having an entirely annular structure is arranged to an outer periphery of the partition wall structure 65 so that a plurality of columns 84 are arranged with spaces from each other. According to such arrangement, the primary coolant passes inside the neutron shield 67 to effectively cool the neutron shielding member 67.

This embodiment of the structure and arrangement described above will operate as follows.

Since the reflector 63 of this embodiment is arranged closely to the outer periphery of the core 61, the neutrons can be effectively reflected, whereby the burn-up and breeding of the fuel can be effectively carried out, and in accordance with the progress of the burn-up of the fuel, the reflector 63 can be gradually moved vertically with the criticarity maintained, so that the new fuel portion of the core 61 is burned up gradually continuously, thus keeping the burn-up for a long time.

The neutron shield 67 shields the neutrons passing or going round the reflector 63 to thereby reduce an amount of neutrons emitted in the space in the reactor vessel 66 and the shielding structure. According to this fact, stainless steel can be used as the constructional material for the reactor vessel 66, thus achieving an economical advantage. Furthermore, since the heat and gas such as argon and nitrogen to be activated in the shielding structure can be reduced in amounts, the cooling equipment of the shielding structure can be made compact in small size, thus alleviating a sealing requirement with respect to the activated argon and nitrogen.

Furthermore, since the reflector 63 and the neutron shield 67 are dipped in the primary coolant, the heat generated by the reflector can be effectively utilized as power of the fast reactor 60, thus realizing a more effective fast reactor.

Still furthermore, in this embodiment, since the electromagnetic pump 73 is disposed downstream side of the intermediate heat exchanger 74, the primary coolant driven by the electromagentic pump 73 has the lowest temperature in the primary coolant circulation cycle. Accordingly, thermal strain to be applied to the electromagnetic pump 73 is very small and the electromagnetic pump 73 has an excellent durability for a long time use, resulting in the elongation of the life time of the fast reactor itself.

Still furthermore, since the electromagnetic pump 73 and associated members are disposed above the core 61 without being interfered with the core, at a core exchanging time, the used core 61 can be taken out from the reactor vessel 66 by removing the upper plug 69 and directly drawing vertically upward the core 61 externally. This eliminates the removing working of the intermediate heat exchanger 74 and the electromagnetic pump 73, which working is not neglected in the conventional structure of the fast reactor, for the fuel exchanging operation, thus obviating damage or breakage of the electromagnetic pump 73 or other members during the fuel exchanging operation.

It is to be noted that, in this embodiment, the core 61, the core barrel 62, the reflector 63, the partition wall structure 65, the neutron shield, the reactor vessel 66 and the guard vessel 68 are arranged respectively outside apart from the central portion of the fast reactor 60, and the coolant passage 64 is formed between the partition wall structure 65 and the reactor vessel 66, but as can be understood from the above description, the following structures are within the scope or range of the present invention; that is, the structure in which the reflector 63 are radially divided into a plurality of reflector sections and the divided reflector sections are axially movably supported; the structure in which the neutron shield 67 is composed of a plurality of columns or multi-structured annular wall member having gaps through which the primary coolant passes; the structure in which the annular electromagnetic pump 73 and the intermediate heat exchanger 74 are disposed in the upper portion of the coolant passage 64 and the reflector 63 is suspended inside the electromagnetic pump 73 and the intermediate heat exchanger 74; and the structure in which the electromagnetic pump 73 and the intermediate heat exchanger 74 are integrally formed with the upper structure of the reactor and the seal bellows 76 is disposed between the lower end of the integral structure and the upper end of the partition wall structure 65 standing on the lower structure of the reactor.

Figure 4:
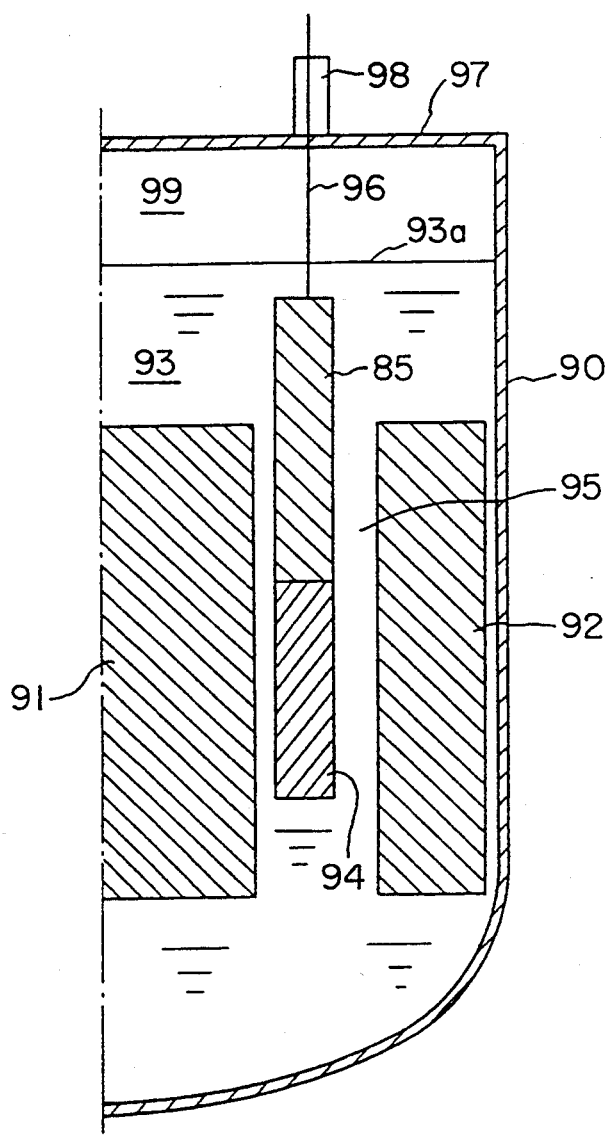
FIG. 4 is a schematic elevational section partially showing a second embodiment according to the present invention.

FIG. 4 is a second embodiment of the present invention which is applied to an incore reflector type sodium cooling small-sized fast reactor having a core equivalent diameter of about 83 cm and an effective length of about 400 cm, and there is utilized a neutron reflector made of stainless steel having a length of about 170 cm and a thickness of about 15 cm.

A core 91 is disposed at the central portion inside the reactor vessel 90 and a neutron shield 92 is disposed so as to surround the periphery of the core 91. The inside of the reactor vessel 90 is filled up with a coolant 93 such as liquid sodium.

The core 91 is composed of eighteen fuel assemblies of, for example, hexagonal shape and a channel, not shown, for a neutron absorbing rod to be withdrawn upward in an operation period for reactivity control of the core 91 is arranged at the central portion of the hexagonal arrangement and surrounded by a core barrel, not shown.

Outside this core barrel, a partition wall structure, not shown, for sectioning the passage of the coolant 93 is arranged apart from the core barrel with a predetermined distance and an area 95 for moving the neutron reflector 94 utilized for the operation of the core 91 is defined by the space between the core barrel and the partition wall structure.

A neutron absorber 85 formed of such as natural boron degraded in neutron reflecting ability in comparison with the coolant 93 and having substantially the same cross section as that of the neutron reflector 94 is disposed above the neutron reflector 94 so as to provide a continuous structure thereof. The neutron absorber 85 has an upper end portion to which a lower end portion of a driving rod 96 is connected. According to such structure, the driving rod 96 is vertically moved by the operation of a driving mechanism 98 and, hence, the neutron reflector 94 and the neutron absorber 85 are integrally moved vertically in the moving area 95 between the core barrel and the partition wall structure.

This second embodiment will operate as follows.

First, there will be described the changing of the reactivity in a case where the neutron reflector 94 and the neutron absorber 85 are moved upward from the positional relationship shown in FIG. 5A to that shown in FIG. 5B. At this time, it is of course natural that the reactivity is increased by the changing of the relative positional relationship between the neutron reflector 94 and the core 91, but the changing of the reactivity is caused by the fact that an area surrounded by the coolant in the core and an area surrounded by the neutron absorber 85 are different from each other.

Figures 5A, 5B:
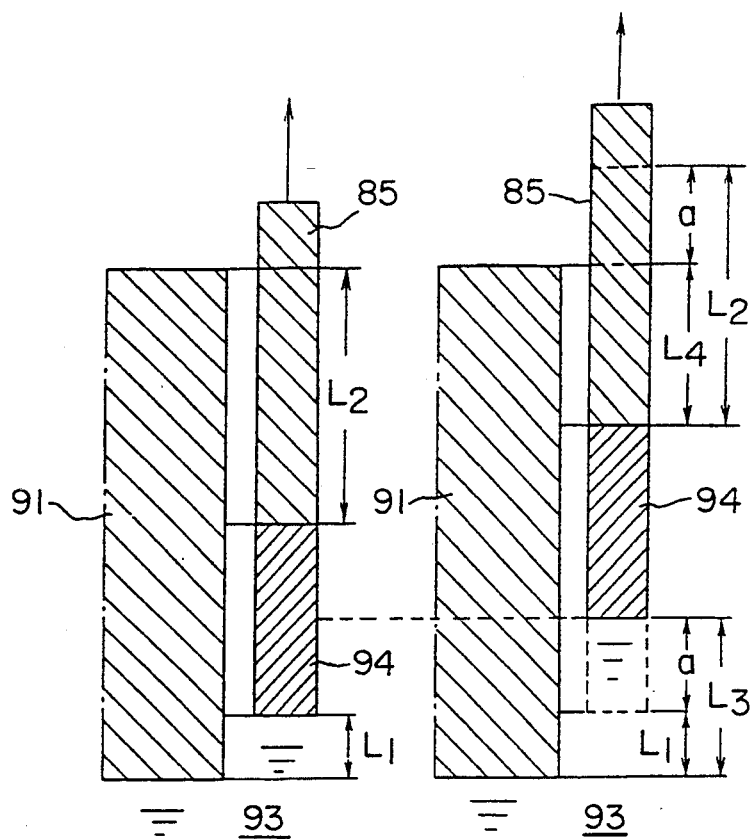
FIGS. 5A and 5B are views explanatory of function in a case in which a neutron reflector is moved upward.

Namely, referring to FIG. 5A, the outer periphery of the core 91 is surrounded by the coolant 93 at the area having a length L1 and by the neutron absorber 85 at the area having a length L2. On the other hand, referring to FIG. 5B, the outer periphery of the core 91 is surrounded by the coolant 93 at the area having a length L3 and by the neutron absorber 85 at the area having a length L4. Accordingly, in the positional relationship in FIG. 5B, the area surrounded by the coolant 93 is increased by an area corresponding to the length $\underline{a}$ (L3−L1=L2−L4=$\underline{a}$) and the area surrounded by the neutron absorber 84 is decreased by an area corresponding to the length $\underline{a}$ in comparison with the positional relationship of FIG. 5A. Accordingly, the difference in the neutron reflecting ability between the neutron absorber 84 and the coolant 93 of this area having the length $\underline{a}$ is added to the reactivity on the side surface of the core 91.

Figure 6:
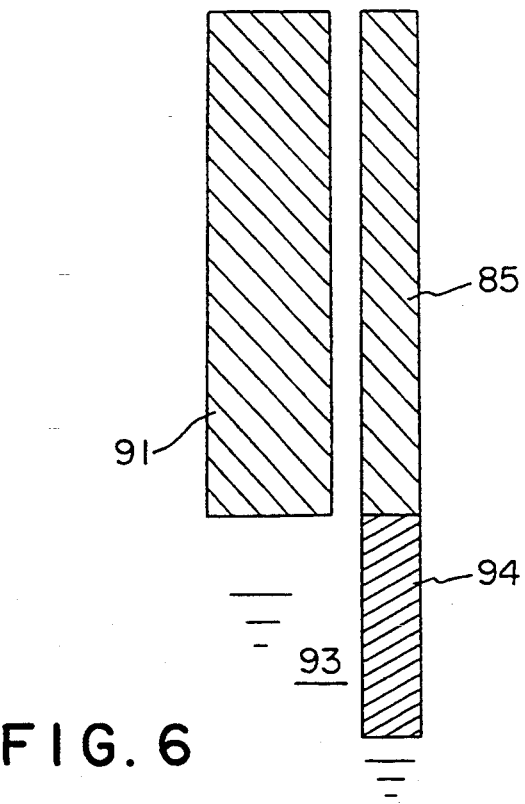
FIG. 6 is a view explanatory of function in a case of beginning of life (BOL)

FIG. 6 shows a state of the beginning of life (BOL) at which the neutron reflector 94 is positioned at the lower portion of the core 91. In this state, the periphery of the core 91 is surrounded by the neutron absorber 85, rather than the coolant 93, which is degraded in the neutron reflecting ability in comparison with the coolant 93, so that the reactivity can be suppressed to a low value in comparison with a prior art structure in which the core is surrounded by the coolant. Thus, the enrichment of the fuel can be enhanced by an extent corresponding to the suppressed reactivity to thereby distribute the elongation of the reactivity life time of the core 91. In this case, it is preferred to surround the entire periphery of the core 91 by the neutron absorber 85.

Figure 7:
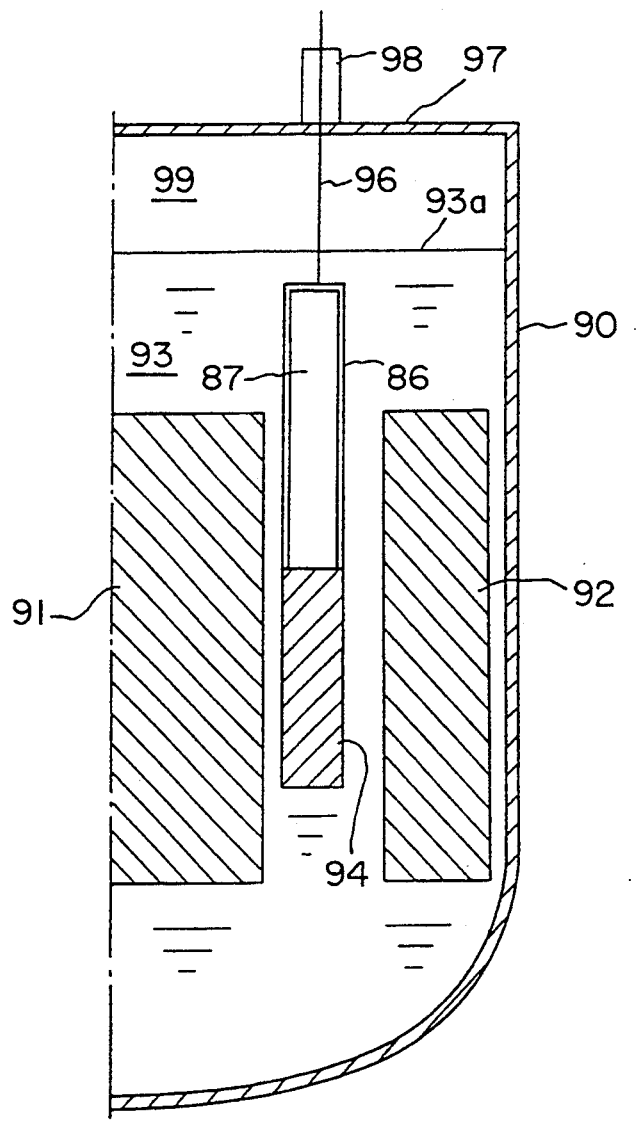
FIG. 7 is a schematic elevational section similar to that of FIG. 4 but related to a third embodiment according to the present invention.

FIG. 7 represents a third embodiment of the fast reactor according to the present invention. Referring to FIG. 7, in this embodiment, vacuum condition or air filling condition having a neutron reflecting ability less than that of the coolant 93 is utilized in place of the neutron absorber 85 in the former embodiment. Namely, as shown in FIG. 7, a sealed space 87 is defined by a box-like member 86 above the neutron reflector 94 and this space 87 is made vacuum or filled up with gas.

For the comparison of the effects attained by the structures of the above two embodiments with those attained by the conventional structure, the resulted reactivity lives of burn-up calculations of the cores of these structures are shown in the following table.

| | Effects to Reactivity Life | |
|---|---|---|
| | Reactivity Life | Relative Value |
| Reflector Upper Portion Coolant (Prior Art) | about 6 years | 1 |
| Natural Boron (Second Embodiment) | about 10 years | 1.7 |
| Vacuum or Gas (Third Embodiment) | about 10 years | 1.7 |

It will be seen from this table that the reactivity life of the core can be expanded about 1.5 time according to the embodiments of the present invention in comparison with the conventional example.

In the respective embodiments, since the neutron reflector 94 and a substance having a neutron reflecting ability less than that of the coolant 93 disposed above the reflector 94 are vertically moved integrally, it is necessary to provide a space for accommodating the substance above the core 91. However, it is difficult to provide such space in a narrow interior of the reactor vessel in the point of the core structure.

Figure 8:
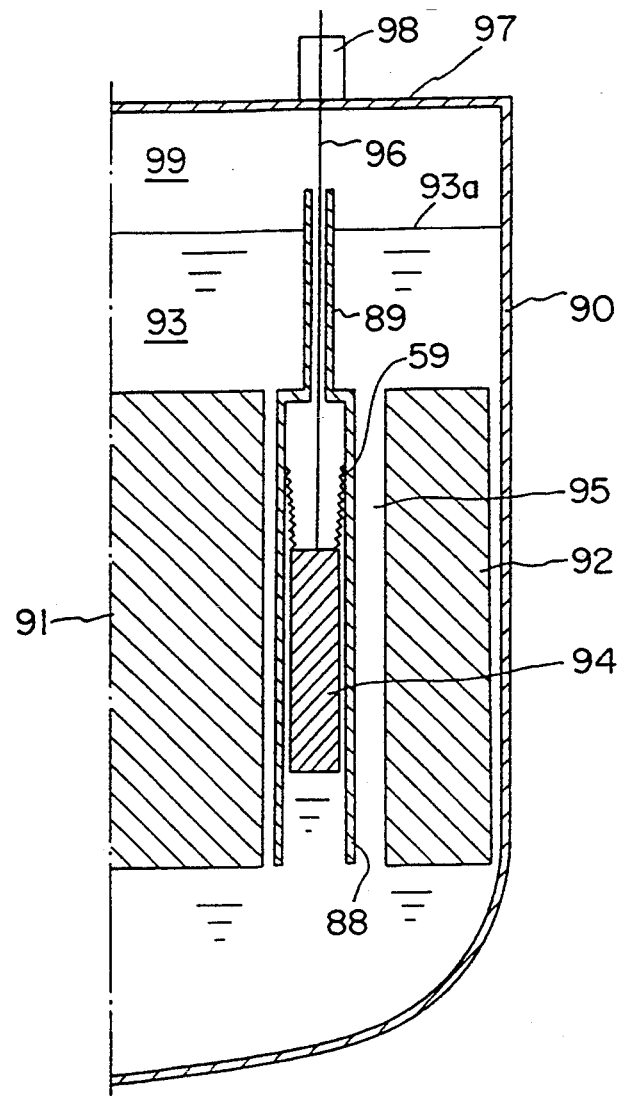
FIG. 8 is a schematic elevational section similar to that of FIG. 4 but related to a fourth embodiment according to the present invention.

FIG. 8 represent a fourth embodiment which substantially eliminates the above defect. In this fourth embodiment, a guide box 88 having approximately U-shape in section with a downward opening and extending along substantially an entire axial length of the core 91 is fixedly arranged in a moving area 95 on the side of the core 91. The upper end portion of the guide box 88 is communicated with a cover gas space 99 above the level of the coolant 93 through a communication tube 89 and a sealing bellows 59 is disposed between the upper end portion of the neutron reflector 94 and an upper portion of the inner peripheral surface of the guide box 88. According to such structure, the neutron reflector 94 moves vertically inside the guide box 88 and a cover gas is introduced into the cover gas space 99 above the guide box 88. A boundary between the introduced cover gas and the coolant can be sealed by the sealing bellows 59.

A driving rod 96 is connected to the upper end portion of the neutron reflector 94 so as to extend in the communication tube 89. For example, other sealing means such as metal ring may be utilized in place of the sealing bellows 59.

In this fourth embodiment, the guide box 88 is fixed with respect to the core 91, and when an inner volume of the guide box 88 is reduced in accordance with the lift-up of the neutron reflector 94, the coolant 93 of the amount corresponding to the reduced volume in the guide box 88 is supplied to a portion below the neutron reflector 94.

Figure 9:
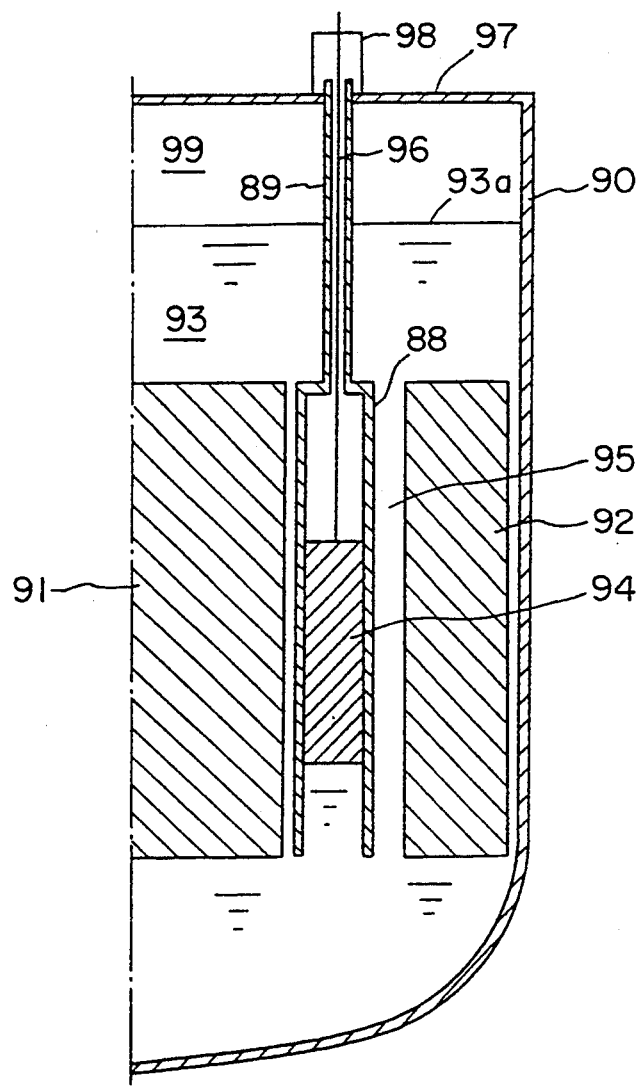
FIG. 9 is a schematic elevational section similar to that of FIG. 4 but related to a fifth embodiment according to the present invention.

FIG. 9 represents a fifth embodiment of the fast reactor according to the present invention, which differs from the fourth embodiment in a structure such that the communication tube 89 extends further upwards externally of the reactor vessel 90 through a shielding plug 97 so that the gas is introduced into the inner space of the guide box 88 from the upper end opening of the extended communication tube 89 and that the bellows 59 is removed in this fifth embodiment.

According to the fifth embodiment, a pressure inside the guide box 88 can be controlled from the outside of the reactor vessel 90, and hence, the surface level of the coolant 93 below the neutron reflector 94 can be optimumly adjusted.

Figure 10:
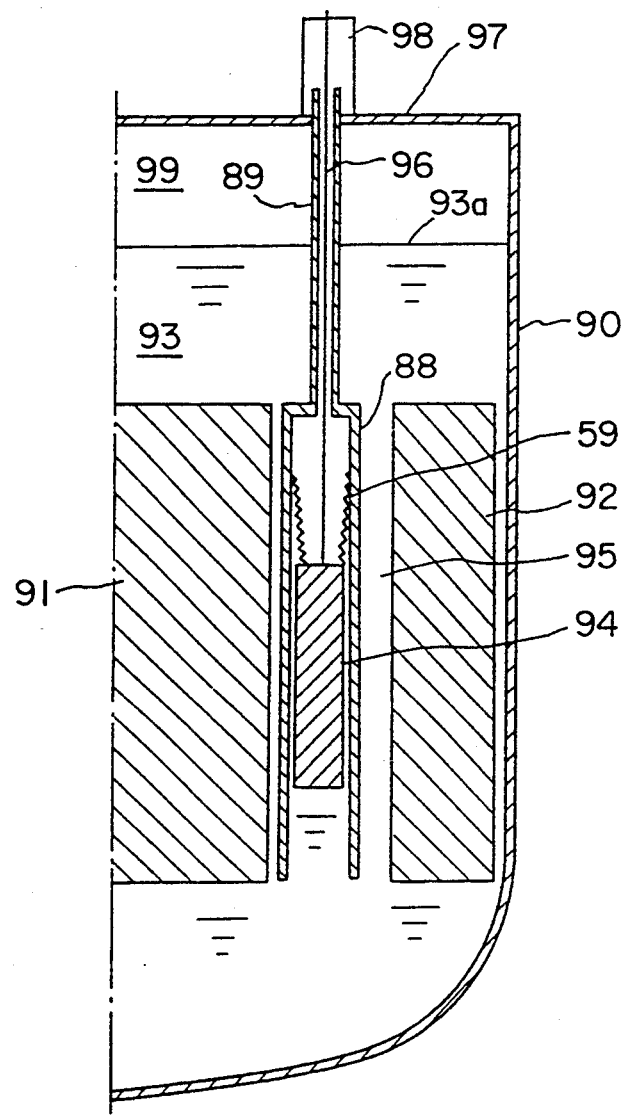
FIG. 10 is a schematic elevational section similar to that of FIG. 4 but related to a sixth embodiment according to the present invention.

FIG. 10 shows a sixth embodiment of the fast reactor according to the present invention, which is provided commonly with the characteristic features of the fourth and fifth embodiments mentioned above. Namely, in the structure of the sixth embodiment, the communication tube 88 extends upwards externally of the reactor vessel 90 through the shielding plug 97 to thereby introduce the gas from the outside of the reactor vessel 90 into the guide box 88 and the sealing bellows 59 is disposed between the upper end portion of the neutron reflector 94 and the upper portion of the inner peripheral surface of the guide box 88 to thereby seal the boundary between the gas externally introduced into the guide box 88 and the bellows 59.

Figure 11:
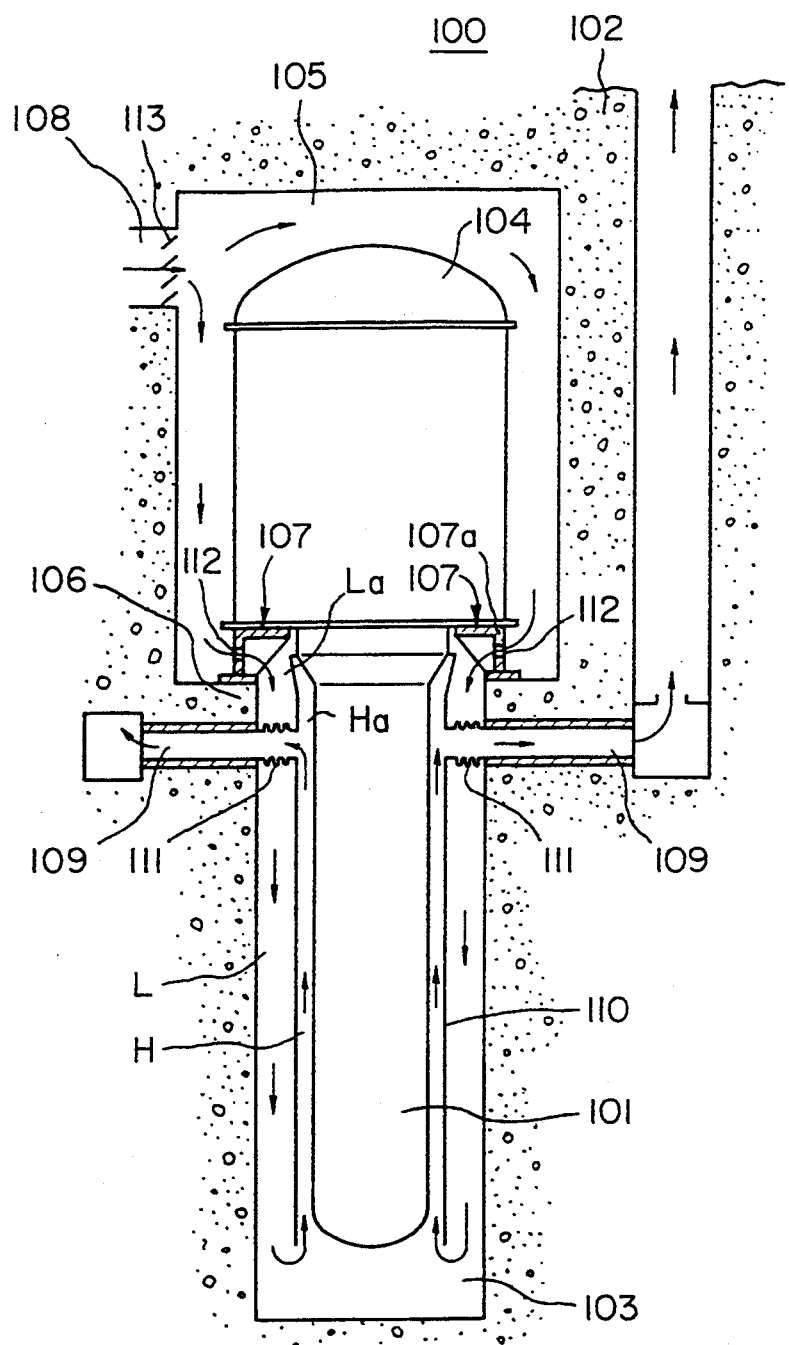
FIG. 11 is a schematic elevational view of a fast reactor of a seventh embodiment according to the present invention.

FIG. 11 shows a structure of the fast reactor according to a seventh embodiment of the present invention, in which a fast reactor 100 is provided with a reactor vessel 101 in which a core is accommodated. A reactor containment vessel 102 is substantially entirely formed of concrete to define an inner space which defines a reactor vessel chamber 103 in which the body of the reactor vessel 101 is accommodated and a reactor upper chamber 105 in which a containment dome 104 covering the upper portion of the reactor vessel 101 is accommodated. A stepped portion is formed at a boundary portion between the reactor upper chamber 105 and the reactor vessel chamber 103, the stepped portion constituting a core support portion for supporting the reactor vessel 101. The reactor vessel 101 is fixed on a reactor support ring 107 fixed on the reactor support portion or structure 106 to be vertically, as viewed in an installed condition, thermally expandable and contractable with the reactor support ring 107 being its center.

Inside the concrete wall structure of the reactor containment vessel 102, there are disposed an air supply duct 108 communicated with the upper portion of the core upper chamber 105 and an exhaust duct 109 communicated with the upper portion of the reactor vessel chamber 103. A reactor vessel air cooling cylinder 110 is arranged so as to surround the outer peripheral wall of the reactor vessel 101 with a space therefrom. The air cooling cylinder 110 has an upper end portion connected to the upper portion of the reactor vessel 101 and a lower end portion opened to the lower space of the reactor vessel chamber 103.

Figure 12:
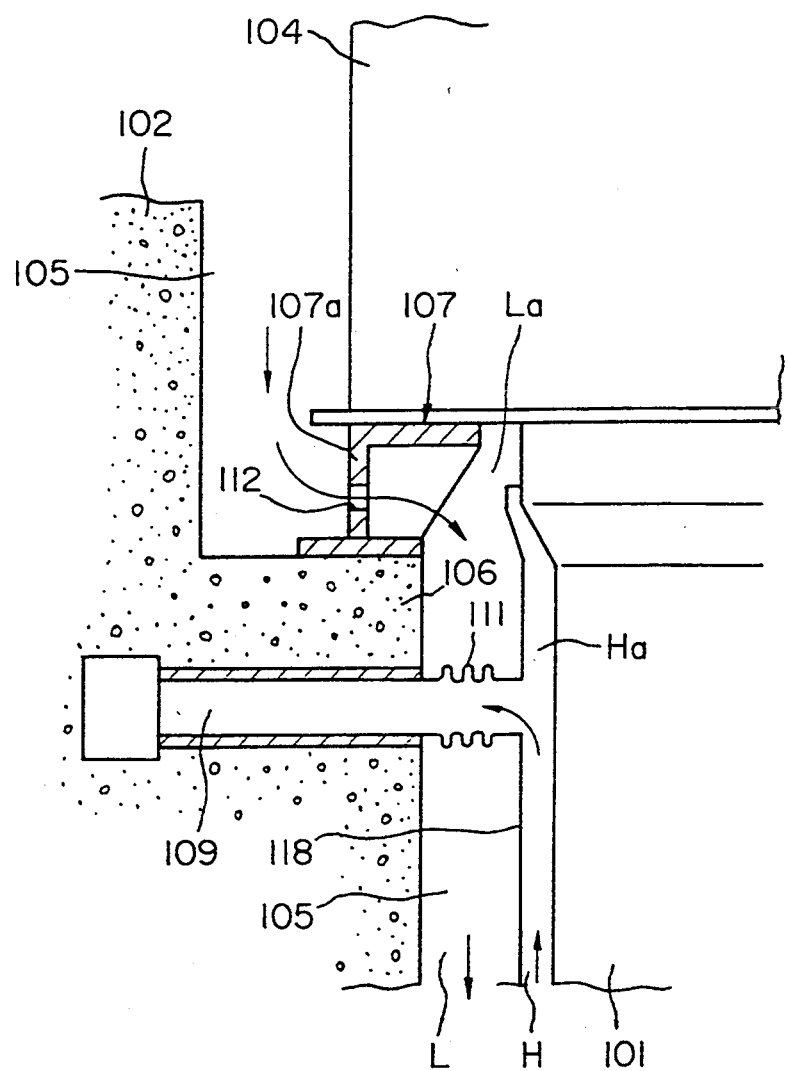
FIG. 12 is a sectional view in an enlarged scale of a reactor support structure of the seventh embodiment.

As clealy shown in FIG. 12, to an upper portion of the reactor vessel air cooling cylinder 110, there is disposed an exhaust bellows 111 having one end connected to the exhaust duct 109 and other end communicated with the inside space of the reactor vessel cooling cylinder 110. Further, as shown in FIG. 12, the reactor support ring 107 is formed with a cylindrical portion 107a having a predetermined height and the cylindrical portion 107a is punched with a plurality of through holes 112 through which air flows.

The seventh embodiment of the structure described above and shown in FIGS. 11 and 12 will operate in the following manner.

The fast reactor 100 of this embodiment contains a core, not shown, composed of a plurality of fuel assemblies. Heat is generated by fission of the fuel in the core and the heat is taken out externally through the heat exchanging operation between the primary coolant and the secondary coolant to thereby convert the heat into dynamic power. Accordingly, during the operation or running of the core, the reactor vessel 101 is heated highly and it is hence necessary to continuously cool the reactor vessel 101. The arrows in FIGS. 11 and 12 show the flow direction of the cooling air. As shown in FIG. 11, the cooling air flows into the reactor upper chamber 105 from the air supply duct 108 through a filter 113, then flows into the reactor vessel chamber 103 through the through holes 112 of the reactor support ring 107, then rises in an air passage between the reactor vessel cooling cylinder 110 and the reactor vessel 101 and is exhausted into an external space through the exhaust bellows 111 and the exhaust duct 109. Such air flowing can be made in combination of forcible air flowing and natural air flowing.

In such operation, the space defined between the outside of the reactor vessel air cooling cylinder 110 and the inner wall of the reactor vessel chamber 103 constitutes a low temperature air passage L and the space defined by the inside of the reactor vessel air cooling cylinder 110 and the outside of the reactor vessel 101 constitutes a high temperature air passage H. The cooling air flows into the low temperature air passage L of the reactor vessel chamber 103 while cooling the reactor support portion 106 after passing the reactor upper chamber 105. In the low temperature air passage L, the air flows while shutting down the heat transfer between the wall surface of the reactor vessel chamber 103 and the high temperature air passage H. Subsequently, the air flows into the high temperature air passage H through the lower end portion of the reactor vessel air cooling cylinder 110 and rises in the high temperature air passage H while cooling the reactor vessel 101. The high temperature air reaching an air exhaust portion Ha at the upper end portion of the high temperature air passage H is discharged to the exhaust duct 109 through the exhaust bellows 111 without applying thermal affect on the reactor support ring 107 and the reactor support portion 106.

According to the air flow route described above, the reactor support portion 106 and the reactor support ring 107 are positioned to an air introducing portion La of the low temperature air passage L to thereby always be cooled by the low temperature air and the high temperature air after finishing the cooling is exhausted without heating the reactor support portion 106 and the reactor support ring 107, so that the reactor support portion 106 can be surely maintained with a low temperature, thus improving the safeness and reliability of the reactor. Furthermore, since it is not necessary to locate specific equipment or heat insulating material such as local cooler for locally cooling the reactor support portion 106, the fast reactor 100 having a simple structure can be realized.

Further, it is to be noted that the basic conception of the present invention resides in that the high temperature and low temperature air passages are formed inside and outside of the reactor vessel air cooling cylinder, the reactor support portion is disposed in the air flow-in portion of the low temperature air passage and the air exhaust means for exhausting the high temperature air is disposed at the end portion of the high temperature air passage, and accordingly, the locations or positions of the air supply duct and the exhaust duct and the concrete structure of the air exhaust means are not limited to the embodiments described above. An eighth embodiment of the present invention in which the air supply duct is connected to the through hole of the reactor support ring will be described hereunder with reference to FIG. 13.

Figure 13:
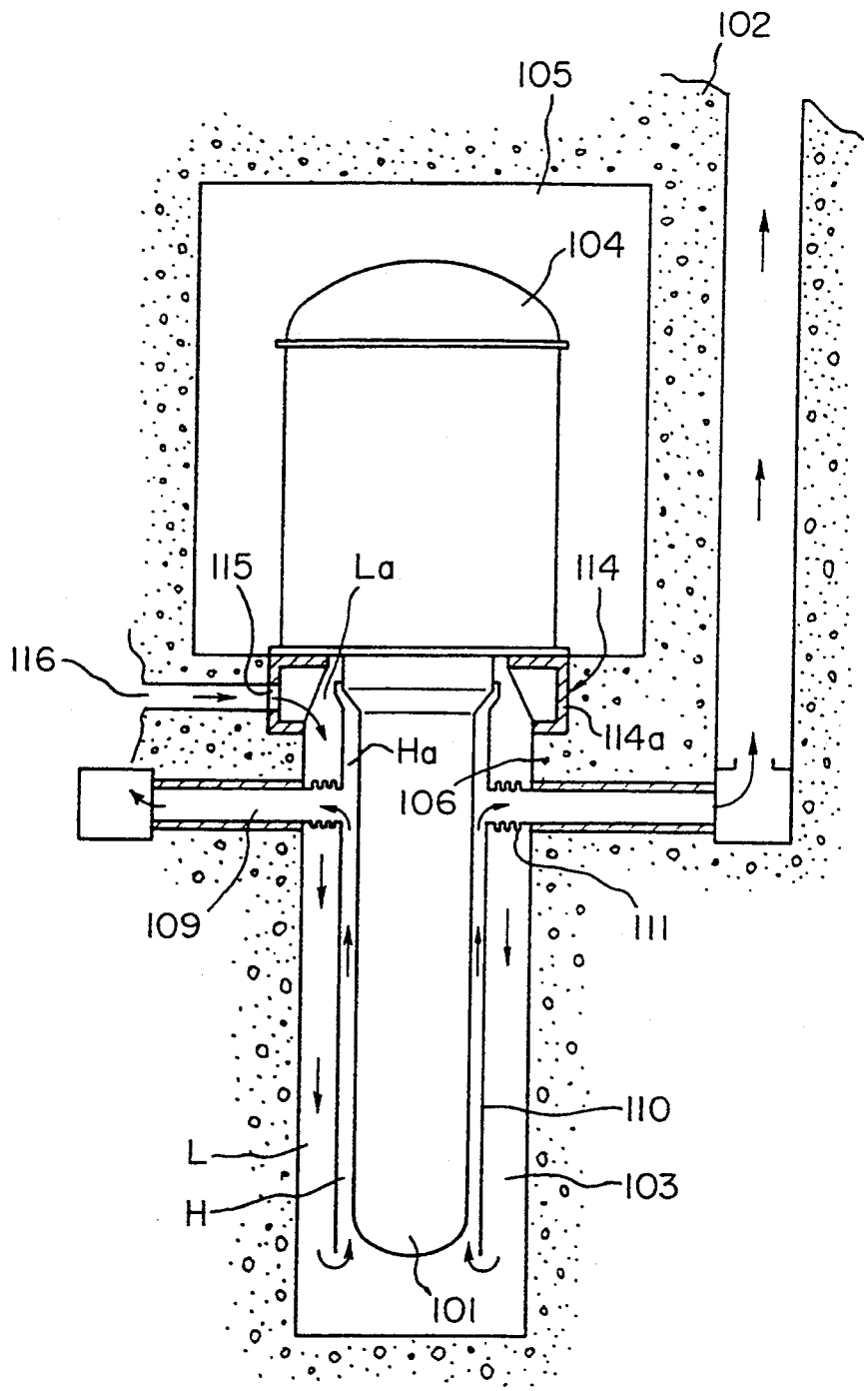
FIG. 13 is a schematic elevational view of a fast reactor of an eighth embodiment according to the present invention.

Referring to FIG. 13, the air supply duct is directly connected to the through hole of the reactor support ring and like reference numerals are added to elements or members corresponding to those shown in FIG. 11 and the detailed description thereof are omitted herein. In the embodiment of FIG. 13, the reactor support ring 114 is embedded in a concrete of the reactor containment vessel 102 at a portion above the reactor vessel chamber 103 and an air introducing hole 115 is formed to a predetermined portion of a cylindrical portion 114a of the reactor support ring 114. An air supply duct 116 is formed in the wall structure of the concrete in a manner such that an outlet of the air supply duct 116 alines with the through hole 115.

According to this embodiment, since the cooling air first cools, without being heated, the reactor support ring 114, the reactor support portion 106 can be effectively maintained with its low temperature due to good heat radiation property of metal material of the reactor support ring 114.

Figure 14:
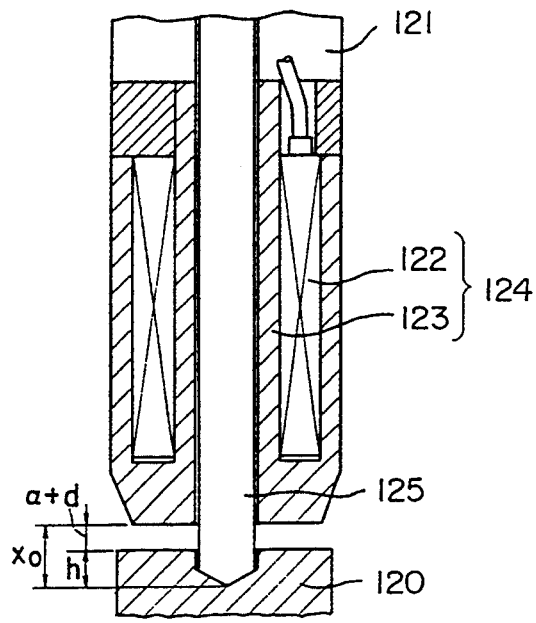
FIG. 14 is a partial elevational section of a neutron absorbing rod driving mechanism, in a state of low-temperature shut-down time, according to an embodiment of another aspect of the present invention.
Figure 15:
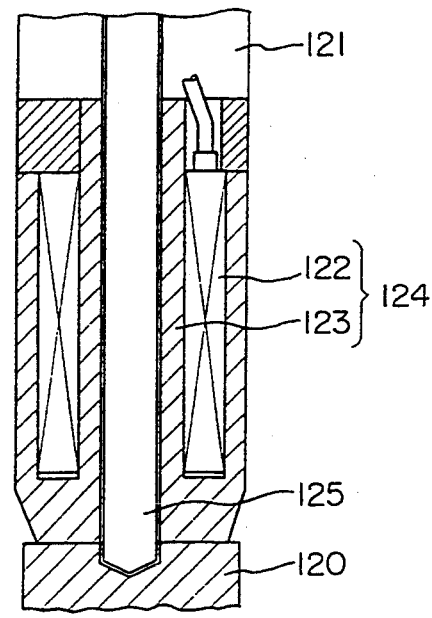
FIG. 15 is a partial elevational section of a neutron absorbing rod driving mechanism of the embodiment of FIG. 14, in a state in which an electromagnet attracts the neutron absorbing rod at a time when a temperature of a coolant rises up to a predetermined temperature.
Figure 16:
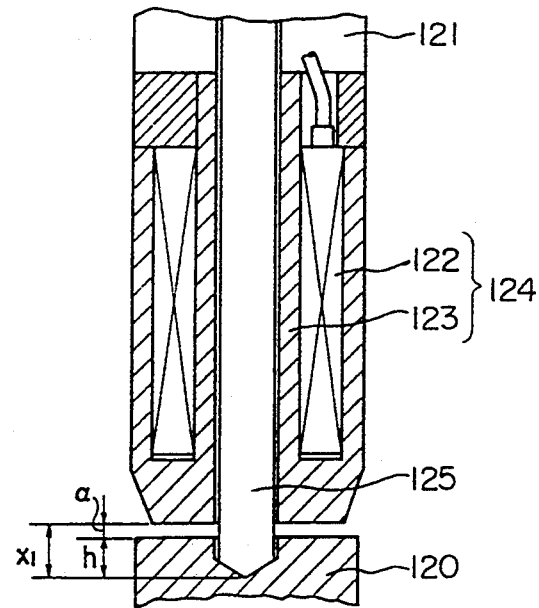
FIG. 16 is a partial elevational section of a neutron absorbing rod driving mechanism of the embodiment of FIG. 14, in a state just before the electromagnet attracts the neutron absorbing rod at a time when a temperature of a coolant rises up to a predetermined temperature.

FIGS. 14 to 16 represent a neutron absorbing rod driving mechanism having high safety structure in which a neutron absorbing rod is not attracted to a neutron absorbing rod holding rod by means of an electromagnet till a time when the temperature of the coolant reaches a predetermined temperature such as 350° C. and, accordingly, it is prevented to erroneously draw out the neutron absorbing rod from the core in a temperature area having a large temperature compensation reactivity.

The neutron absorbing rod 120 has an upper end portion connected to the neutron absorbing rod holding rod 121 through the electromagnet 124 and extends axially perpendicularly so as to be inserted into the central portion of the core 61.

The neutron absorbing rod 120 is inserted into the core 61 at the reactor shut-down time, but it is to be withdrawn therefrom at the reactor operation time. However, because the temperature compensation reactivity is large till the time when the coolant is preheated to the temperature of 350° C., it is necessary to construct the neutron absorbing rod 120 not to be withdrawn from the core 61. Namely, till the time of the temperature rising of 350° C., the neutron absorbing rod 120 has to be constructed not to be attracted to the neutron absorbing rod holding rod 121 by the electromagnet 124.

As shown in FIG. 14, the neutron absorbing rod holding rod 121 is arranged above the neutron absorbing rod 120, and the electromagnet composed of a coil 122 and an iron core 123 is secured to the lower end portion of the neutron absorbing rod holding rod 121. A guide 125 is formed to these members so as to axially penetrate the neutron absorbing rod holding rod 121 and the electromagnet 124 for positioning these elements. The lower end portion of the guide 125 is formed sharply in section so as to abut against a recess formed to the upper end surface of the neutron absorbing rod 120.

In the described embodiment, a thermal expansioncoeffcient of the neutron absorbing rod holding rod 121 is made larger than that of the guide 125 so that the distance between the lower end of the electromagnet 124 and the lower end of the guide 125 is made small, in comparison with the time of low temperature shut-down time (200° C.), when the temperature of the coolant reaches 350° C. at thereactor operation starting time. The difference in the thermal expansion coefficients will be achieved by changing a substance of the neutron absorbing rod holding rod 121 from that of the guide 125. In one example, the neutron absorbing rod holding rod 121 will be made of stainless steel and the guide 125 will be made of Md.9Cr-1Mo. According to such structure, the neutron absorbing rod 120 is not attracted to the electromagnet 124 till the time when the coolant temperature reaches 350° C. from 200° C., shut-down time, and upon reaching 350° C., the neutron absorbing rod 120 is attracted to the electromagnet 124. This fact will be explained hereunder in accordance with the actual operation.

Namely, supposing the absorbing limit width of the electromagnet 124 being $a(mm)$, the distance from the lower end of the electromagnet 124 to the lower end of the guide 125 at a certain temperature being $X(mm)$ and the height of the recess of the upper surface of the neutron absorbing rod 120 being $h(mm)$, in a case where condition of the following equation (1) is satisfied, the neutron absorbing rod 120 never be attracted by the electromagnet 124.

$$X - h > a \quad (1)$$

When the coolant temperature reaches 350° C., the neutron absorbing rod 120 is attracted by the electromagnet 124, so that the distance $X1$ from the lower end of the electromagnet 124 to the lower end of the guide 125 satisfies the following equation (2) as shown in FIG. 16.

$$X1 = h + a \quad (2)$$

Supposing the distance from the lower end of the electromagnet 124 to the lower end of the guide 125 at the temperature of 200° C. being $X0(mm)$ and supposing that the distance $X0(mm)$ changes to the distance $X1(mm)$ till the time when the temperature of the coolant increases from 200° C. to 350° C., the difference $d(mm)$ in the thermal expansion amounts between the neutron absorbing rod holding rod 121 and the guide 125 is expressed as the following equation (3).

$$d = X0 - X1 \quad (3)$$

Accordingly, as shown in FIG. 14, the distance $X0$ from the lower end of the electromagnet 124 to the lower end of the guide 125 at the low temperature shut-down time (200° C.) is expressed as the following equation (4).

$$X0 = X1 + d = h + a + d \quad (4)$$

According to the structure having the positional relationship described above, the neutron absorbing rod 120 never be attracted by the electromagnet 124 till the time of reaching the temperature of 350° C. from 200° C. (low temperature shut-down time) as shown in FIG. 14.

Upon reaching 350° C., as shown in FIG. 16, the distance between the lower end of the electromagnet 124 and the upper surface of the neutron absorbing rod 120 becomes $a(mm)$ being the absorption limit width, and when the temperature of the coolant becomes more than 350° C., as shown in FIG. 15, the electromagnet 124 attracts the neutron absorbing rod 120.

The above structural feature will be explained in detail by way of concrete numerals.

The neutron absorbing rod holding rod 121 made of stainless steel has a thermal expansion coefficient of $18 \times 10^{-6}$ mm/mm °C. (350° C.) and the guide 125 made of Md.9Cr-1Mo has a thermal expansion coefficient of $12 \times 10^{-6}$ mm/mm °C. (350° C.). The neutron absorbing rod holding rod 121 used for a vertically elongated type reactor vessel has about 10 m length. Accordingly, when the coolant temperature increases from 200° C. to 350° C., the difference $d(mm)$ due to the thermal expansion is expressed as follows.

$$d = (18 - 12) \times 10^{-6} \text{ (mm/mm °C.)} \times (350 - 200)$$
$$(°C.) \times 10000(mm) = 9(mm). \quad (5).$$

Accordingly, in the case of 200° C. of the coolant temperature (low temperature shut-down time), the distance $X0$ from the lower end of the electromagnet 124 to the lower end of the guide 125 is expressed as the following equation (6).

$$X0 = h + a + d = h + a + 9(mm) \quad (6)$$

Accordingly, in the present embodiment, the distance between the lower end of the electromagnet 124 and the upper end of the neutron absorbing rod 120, at the low temperature shut-down time, is set to a distance obtained by adding the absorbing limit width $a(mm)$ of the electromagnet 124 to the difference due to the thermal expansion between the neutron absorbing rod holding rod 121 and the guide 125. Because of this reason, at the low temperature shut-down time, the electromagnet 124 does not attract the neutron absorbing rod 120, and accordingly, even if the neutron absorbing rod holding rod 121 be erroneously moved upward, the neutron absorbing rod 120 is never withdrawn from the core. Therefore, the neutron absorbing rod is not also withdrawn erroneously from the core in the temperature range having large temperature compensation reactivity, thus improving the safeness of the reactor. Furthermore, this safeness compensation operation is performed by utilizing the nature characteristic, i.e. thermal expansion, of the structure without depending on any mechanical operation, thus achieving higher reliability.

Further, it is to be noted that the present invention is not limited to the described embodiments and many other changes or modifications may be made. Particularly, the substances of the neutron absorbing rod holding rod and the guide are not limited to ones described hereinbefore. For example, the substance of the guide 125 may be substituted with ferite steel, which has thermal expansion coefficient of $11 \times 10^{-6}$ mm/mm °C. (350° C.) almost equal to that of the Md.9Cr-Mo, thus substantially the same effects being expected.

Figure 17:
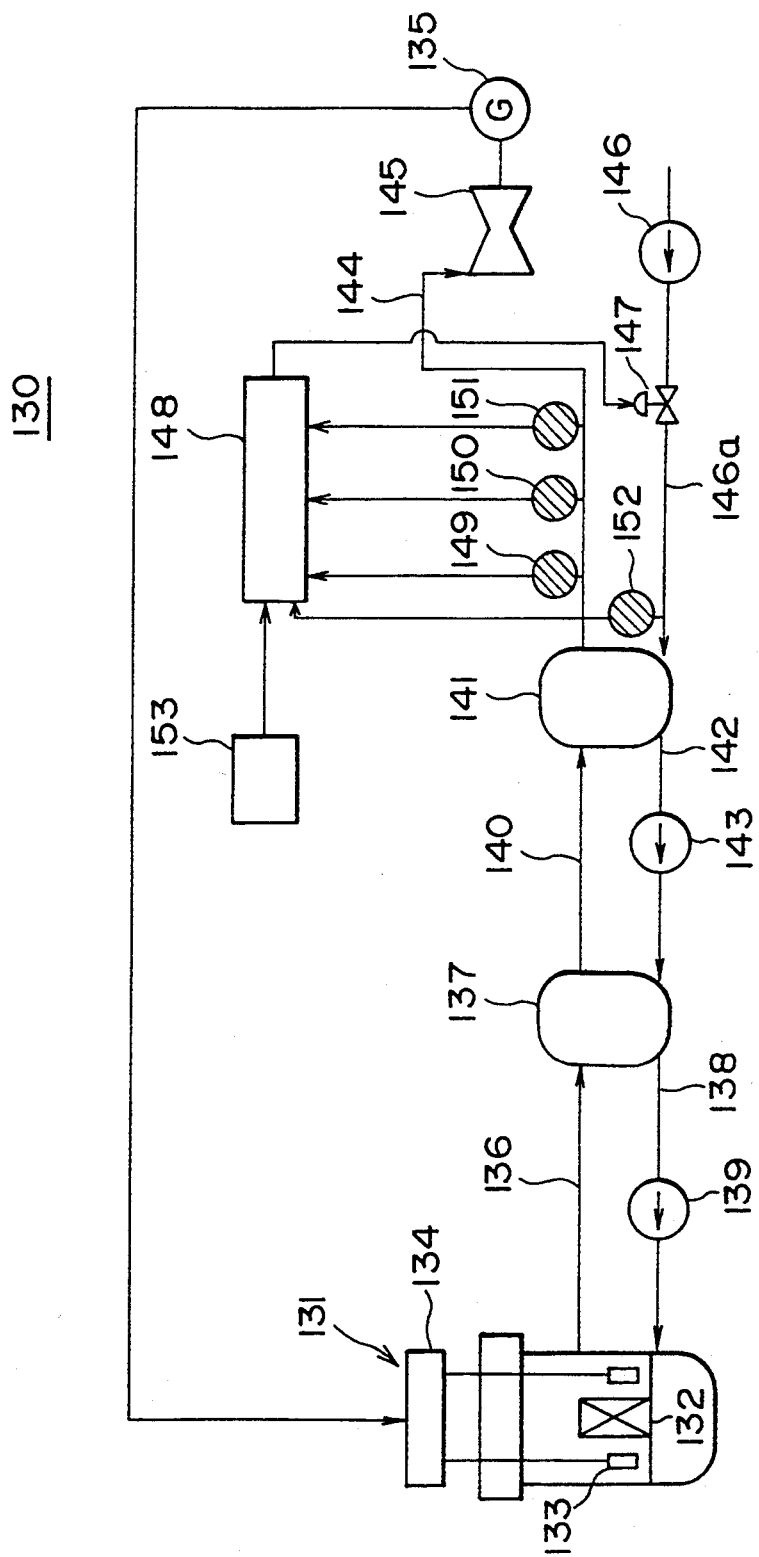
FIG. 17 shows a schematic arrangement of a nuclear power plant according to an embodiment of further aspect of the present invention.

FIG. 17 shows an arrangement of a nuclear power plant having a steam generator and being capable of roughly regulating power control of a fast reactor by displacing a neutron reflector arranged so as to surround the outer periphery of the core and capable of finely regulating the power of the fast reactor by regulating feed water flow rate to the steam generator.

Referring to FIG. 17, the power plant 130 is provided with a fast reactor 131 in which a core 132 is accommodated. A reflector 133 for maintaining a fission chain reaction of the core 132 by reflecting neutron fluxes radiated from the core 132 is disposed so as to surround the outer periphery of the core 132. The reflector 133 is driven vertically movably by a reflector driving mechanism 134. The reflector driving mechanism 134 is operated by a generator 135 of the power plant 130 so as to move upward the reflector 133 with a predetermined moving speed during the plant running period, thus performing the rough regulation of the power of the power plant 130.

During the running period of the power plant, liquid sodium constituting a primary coolant fills inside the fast reactor 131 as well as the core 132 and the primary coolant is heated by the fission chain reaction of the core 132 and fed to an intermediate heat exchanger 137 through a primary coolant high temperature side line 136. In the intermediate heat exchanger 137, the primary coolant carries out a heat exchanging operation with a secondary coolant such as liquid sodium passing the intermediate heat exchanger 137, thus the second coolant being heated through the heat exchanging operation. The primary coolant of low temperature after the heat exchanging operation circulates again to the fast reactor 131 through the primary coolant low temperature side line 138. This circulation of the primary coolant is carried out by the actuation of a primary coolant circulation pump 139.

The secondary coolant heated by the primary coolant in the intermediate heat exchanger 137 is fed to a steam generator 141 as a load heat exchanger through a secondary coolant high temperature side line 140 to thereby heat water fed in the steam generator 141. The secondary coolant of low temperature after the heat exchanging operation in the steam generator 141 circulates again to the intermediate heat exchanger 137 through a secondary coolant low temperature side line 142. This circulation of the secondary coolant is carried out by the actuation of a secondary coolant circulation pump 143.

The water of high temperature after the heat exchanging operation in the steam generator 141 changes into steam, which is then fed to a turbine 145 through a steam line 144 and utilized to drive the turbine 145. The water feed to the steam generator 141 is performed by a water feed pump 146 through a water feed line 146a and a feed water flow rate is adjusted by a flow rate regulating valve 147.

The nuclear power plant of FIG. 17 has a control system or unit of the structure described hereunder and a controlling method thereof is also described hereunder.

An approximate power of the power plant 130 of this embodiment is decided by the lift-up speed of the reflector 133 by means of the generator 135, and the fine regulation of the set power value in the power plant 130 is performed by a plant control system or unit 148. The plant control unit 148 is inputted with a steam temperature Ts at an outlet portion of the steam generator detected by a temperature detector 149, a steam flow rate Gs at the outlet portion of the steam generator detected by a flow rate detector 150, a steam pressure Ps at the outlet portion of the steam generator detected by a pressure detector 151, a feed water flow rate Gw detected by a feed water rate detector 152 and a set power value Wd set by a power setter 153, calculates adjustment value with respect to the feed water flow rate Gw, and then transmits a signal of an opening degree of a feed water flow rate regulating valve to the feed water flow rate regulating valve 147. The fine adjustment of the power of the fast reactor 131 can be performed, by adjusting the feed water flow rate to the steam generator 141, through the secondary coolant, the intermediate heat exchanger 137 and the primary coolant.

Figure 18:
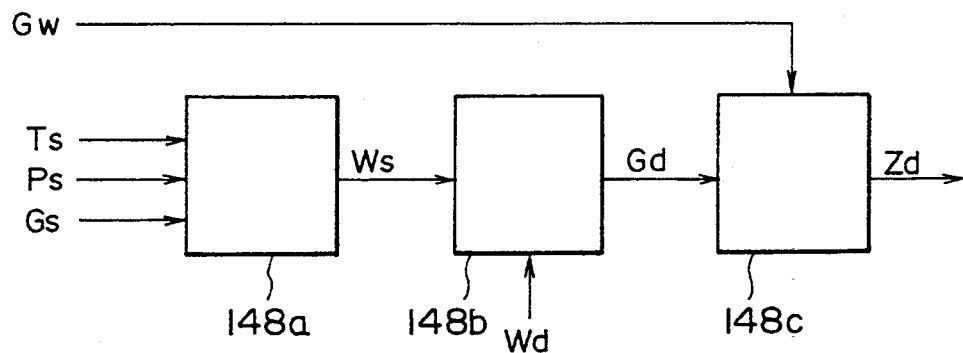
FIG. 18 is a block showing a process flow of a plant control unit according to the present invention.

FIG. 18 shows arrangement of the plant control unit 148, which is composed of a thermal power calculation section 148a, a thermal power control section 148b and a flow rate control section 148c.

The thermal power calculation section 148a calculates the thermal power Ws of the steam generator 141 in response to inputted signals representing the steam temperature Ts, the steam pressure Ps and the steam flow rate Gs.

The thermal power control section 148b carries out a linear calculation with respect to a deviation (Wd−Ws) between the set power value Wd from the power setter 153 as a thermal power control target value of the steam generator 141 and the thermal power Ws of the steam generator from the thermal calculation section 148a, and then sets a feed water flow rate signal Gd to the steam generator 141.

The flow rate control section 148c is inputted with a feed water flow rate Gw and carries out a linear calculation with respect to a deviation (Gd−Gw) between the feed water flow rate Gw and the feed water flow rate signal Gd, whereby a signal Zd representing the opening degree of the feed water flow rate regulating valve and the signal Zd is then transmitted to the feed water flow rate regulating valve 147.

The processings in the respective control and calculation sections of the plant control unit 148 are performed as follows.

Figure 19:
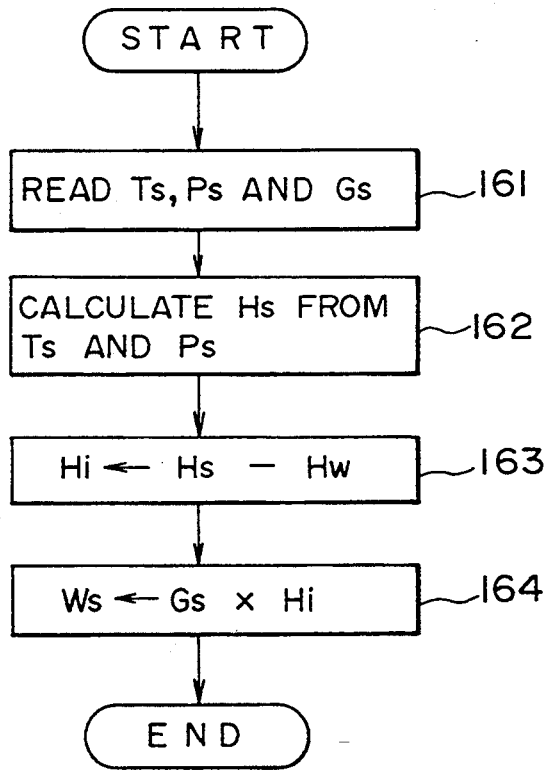
FIG. 19 is a flowchart showing a process flow in a thermal power calculation section.

FIG. 19 is a flowchart showing the processing in the thermal power calculation section 148a. In Step 161, the steam temperature Ts, the steam pressure Ps and the steam flow rate Gs are inputted into the thermal power calculation section 148a. In the next Step 162, a steam enthalpy Hs at the outlet portion of the steam generator is calculated from the steam temperature Ts and the steam pressure Ps. In Step 163, an enthalpy rising Hi in the steam generator 141 is calculated by subtracting a predetermined feed water enthalpy Hw at the power operation period. In Step 164, the thermal power Ws of the steam generator 141 is calculated by the product of the enthalpy rising Hi and the steam flow rate Gs.

FIG. 20 is a flowchart showing the processing in the thermal control section 148b. In Step 171, the set power value Wd of the power setter 153 as the contol target value of the steam generator 141 and the thermal power Ws calculated by the thermal power calculation section 148a are inputted into the thermal power control section 148b. In the next Step 172, a deviation (Wd−Ws) between the set power value Wd and the thermal power Ws of the steam generator 141 are calculated. With respect to this deviation, a linear calculation such as proportional, integral or differential calculation and the feed water flow rate signal Gd is accordingly set.

FIG. 21 is a flowchart showing the processing in the flow rate control section 148c. In Step 181, the feed water flow rate Gw detected by the feed water flow rate detector 152 and the feed water flow rate signal Gw set by the thermal power control section 148b are inputted into the flow rate control section 148c. In the next Step 182, the deviation (Gd−Gw) between the feed water flow rate Gw and the feed water flow rate signal Gd is calculated, and with respect to this deviation, a linear calculation such as proportional, integral or differential calculation is performed, thus obtaining the feed water flow rate regulating valve opening degree signal Zd. This signal Zd is transmitted to the feed water flow rate regulating valve 147.

This embodiment operates in the following manner.

According to this embodiment, the power of the fast reactor 131 is almost controlled by the lift-up speed of the reflector 133 directly driven by the power of the generator 135, and according to this fact, such accident as excessive lift-up of the reflector 133 by a failure or erroneous operation of the control mechanism for driving the reflector 133 and application of the excessive reaction can be prevented. Further, structure of the driving mechanism and control circuit for driving the reflector 133 can be simplified, resulting in the realization of the compcat structure of the nuclear power plant itself.

Furthermore, according to this embodiment, the fine adjustment of the power of the fast reactor 131 can be performed by controlling the feed water flow rate Gw for the steam generator 141. The controlling of the feed water flow rate Gw affects the temperature of the secondary coolant at the outlet side of the steam generator 141 through the heat exchanging operation of the steam generator 141 and further affects the temperature of the primary coolant at the inlet side of the fast reactor 131 through the secondary coolant and the intermediate heat exchanger 137. The temperature of the primary coolant at the inlet side of the fast reactor 131 affects the chain reaction of the core 132 of the fast reactor 131. According to this result, the power of the fast reactor 131 is automatically set to a value corresponding to the power of the steam generator 141. For example, when the set value of the thermal power of the steam generator 141 is raised by 10% of the rated power value, the feed water flow rate Gw is controlled to be increased. Accordingly, the temperature of the secondary coolant at the outlet side of the steam generator 141 descends, and hence, the temperature of the primary coolant at the inlet side of the fast reactor 131 also descends through the secondary coolant, the intermediate heat exchanger and the primary coolant. According to this result, a positive reactivity is applied to the core 132 due to the temperature feedback effect, the thermal power of the fast reactor 131 increases and the set value of the thermal power is adjusted to a value increased by 10% of the rated value corresponding to the thermal power of the steam generator 141.

As described above, according to this embodiment of the present invention, since the power of the fast reactor 131 can be adjusted to a value corresponding to the set value of the thermal power of the steam generator 131 by controlling only the feed water flow rate Gw without operating the control rod, even in the failure of the plant control unit 148, the control rod is prevented from erroneously drawing out to apply the reactivity to the core, whereby the nuclear power plant can be safely and stably operated.

Figure 22:
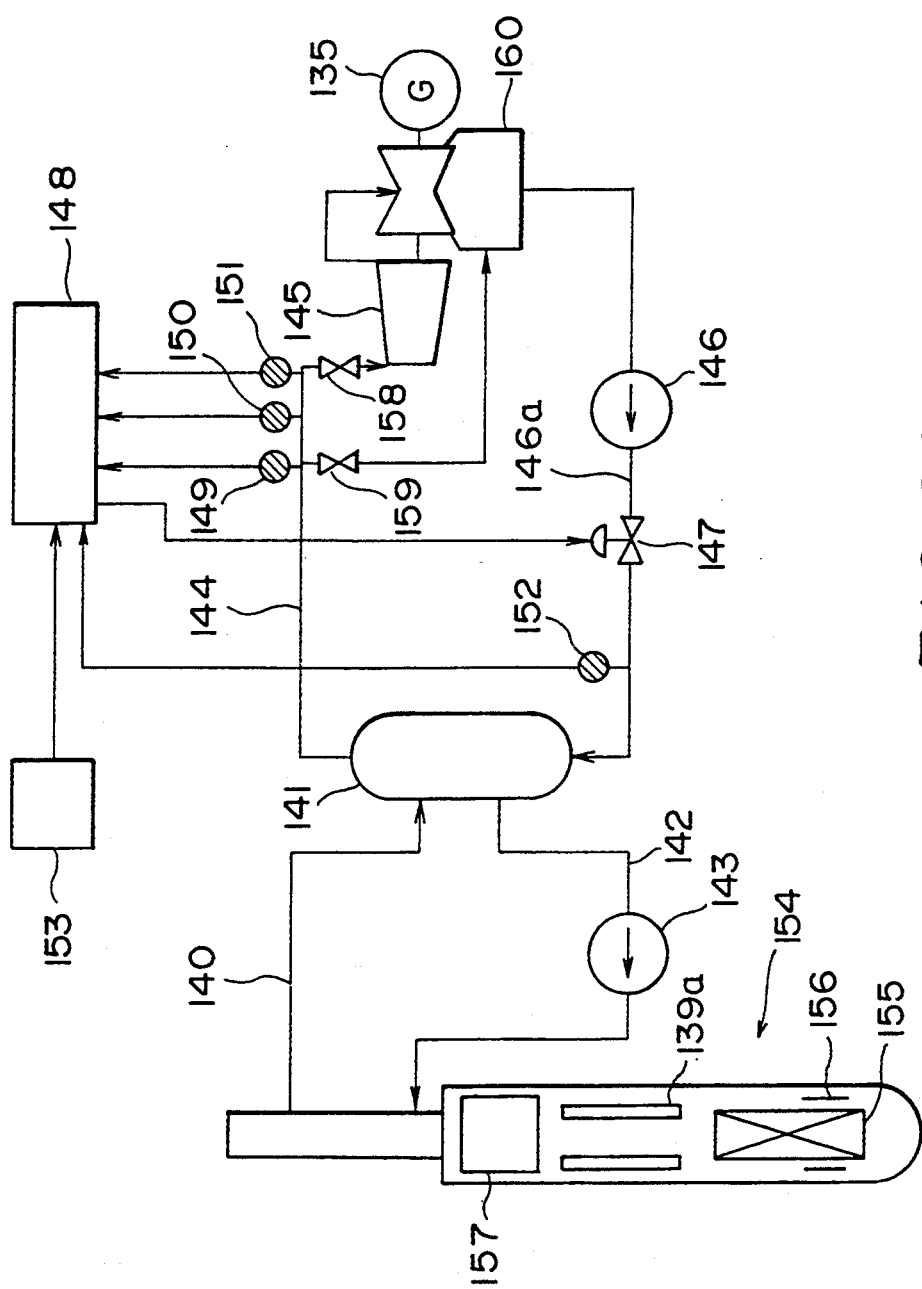
FIG. 22 shows a schmatic arrangement of a nuclear power plant according to another embodiment of the present invention.

Another embodiment of the nuclear power plant according to the present invention will be further described hereunder with reference to FIG. 22, in which like reference numerals are added to elements or units corresponding to those of the former embodiment of FIG. 17.

Referring to FIG. 22, a fast reactor 154 contains a core 155 disposed at the inside lower portion of the fast reactor 154. A reflector 156 is arranged so as to surround the outer periphery of the core 155 and an intermediate heat exchanger 157 is disposed to an inside upper portion of the fast reactor 154. The reflector 156 is driven vertically as viewed by a driving mechanism, not shown. A primary coolant fills the inside of the fast reactor 154 and is driven by a primary coolant circulation pump 139a so as to pass the intermediate heat exchanger 157 through which a secondary coolant also passes to carry out the heat exchanging operation therein with the primary coolant. The secondary coolant is driven by a secondary coolant circulation pump 143 and circulates between the intermediate heat exchanger 157 and the steam generator 141. The feed water heated through the heat exchanging operation in the steam generator 141 changes into steam, which is then fed to the turbine 145 through the steam line 144 to thereby drive the turbine 145.

In this embodiment, the revolution number of the turbine 145 is regulated to a predetermined number by a main steam governor 158 and the main steam pressure is controlled to a predetermined pressure by a turbine bypass valve 159. The steam driving the turbine 145 and the bypassed steam are condensed to water by a condenser 160, which is then recirculated by the operation of the feed water pump 146, and the feed water flow rate Gw is regulated by the feed water flow rate regulating valve 147.

The power control of the fast reactor 154 at the running start time of the power plant will be explained hereunder with reference to the flowchart of FIG. 23.

Figure 23:
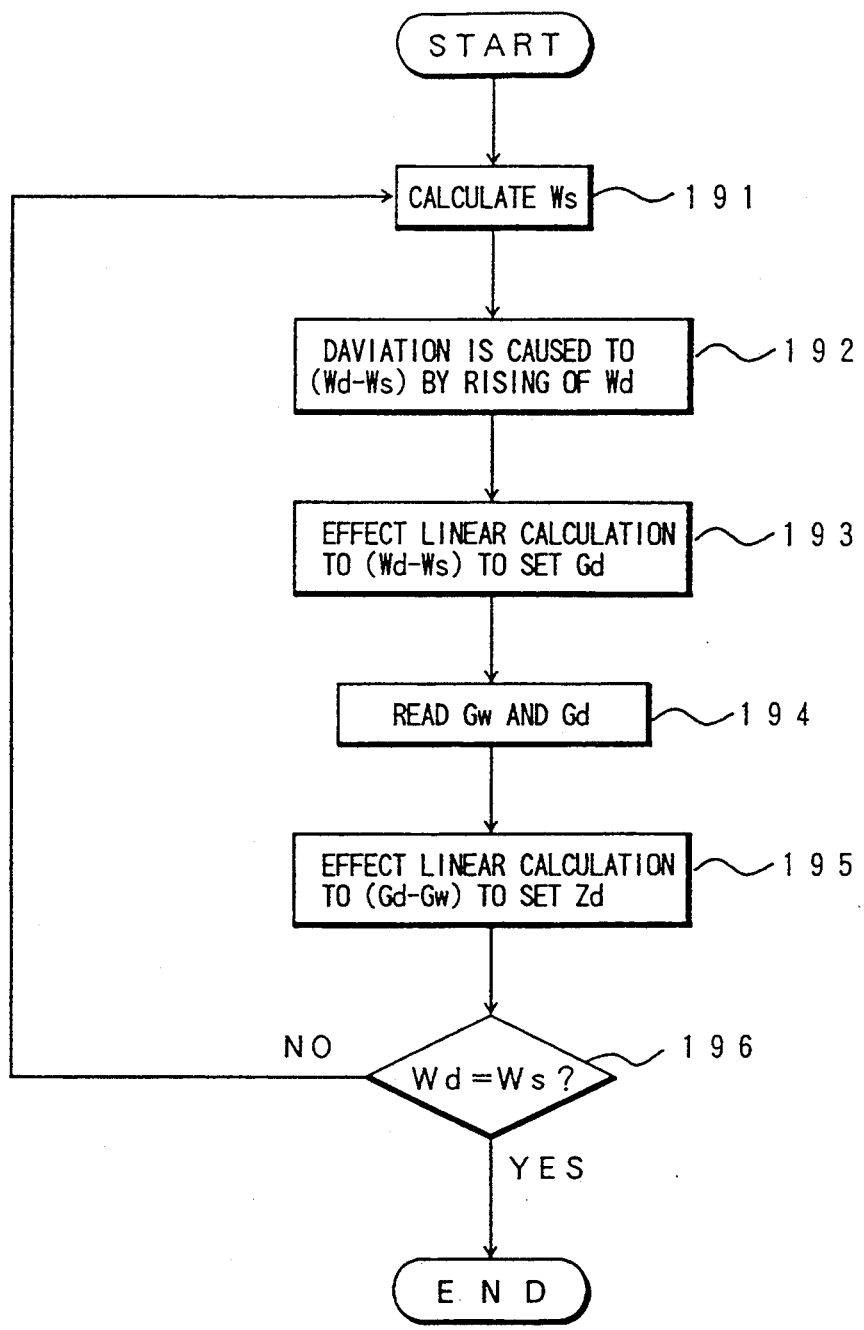
FIG. 23 is a flowchart showing a control flow at an operation starting time of the nuclear power plant of the embodiment of FIG. 22.

Referring to FIG. 23, in Step 191, the thermal power Ws of the steam generator 141 is calculated by the thermal power calculation section 148a. In the next Step 192, the power value Wd set by the thermal power control section 148b is inputted to obtain the deviation from the thermal power Ws. At the operation starting time, since the set power value Wd inputted into the thermal control section 148b rises at a constant rate of change, a deviation (Wd−Ws) is always caused between the set power value Wd and the thermal power calculated by the thermal power calculation section 148a. In Step 193, a linear calculation is effected to this deviation (Wd−Ws) and the feed water flow rate signal Gd is set so as to increase the thermal power of the steam generator 141. In Step 194, the feed water flow rate signal Gd and the feed water flow rate Gw are inputted into the flow rate control section 148c. In Step 195, the deviation (Gd−Gw) between the feed water flow rate signal Gd and the feed water flow rate Gw is obtained by the flow rate control section 148c, and with respect to this deviation, a linear calculation such as proportional, integral or differential calculation is effected, whereby the signal Zd of the opening degree of the feed water flow rate regulating valve so as to increase the fed water flow rate Gw. In Step 196, the set power value Wd after the control and the thermal power Ws are compared with each other, and in the case of NO (not equal), the above processes are repeated till the time when the set power value Wd becomes equal to the thermal power Ws.

As described above, the affect of the increasing of the feed water flow rate Gw due to the feed water flow rate controlling operation performed so as to increase the thermal power Ws of the steam generator 141 in accordance with the increasing of the set power value Wd is realized as the lowering of the temperature of the secondary coolant at the outlet portion of the steam generator 141 and further realized as the lowering of the temperature of the primary coolant through the secondary coolant and the intermediate heat exchanger. According to the lowering of the temperature of the primary coolant, the reaction of the core 155 is activated and the power of the fast reactor 154 then increases. Such controlling operation is continued till the time when the set power value Wd becomes the rated set power value and the thermal power of the fast reactor 154 is adjusted to the rated value. Accordingly, without operating the control rod and by controlling only the feed water flow rate Gw, the power of the power plant can be increased to the rated value safely and stably.

In the following, reactor burn-up compensation control and generator load follow-up control will be explained with reference to the above embodiment of the present invention.

Figure 24:
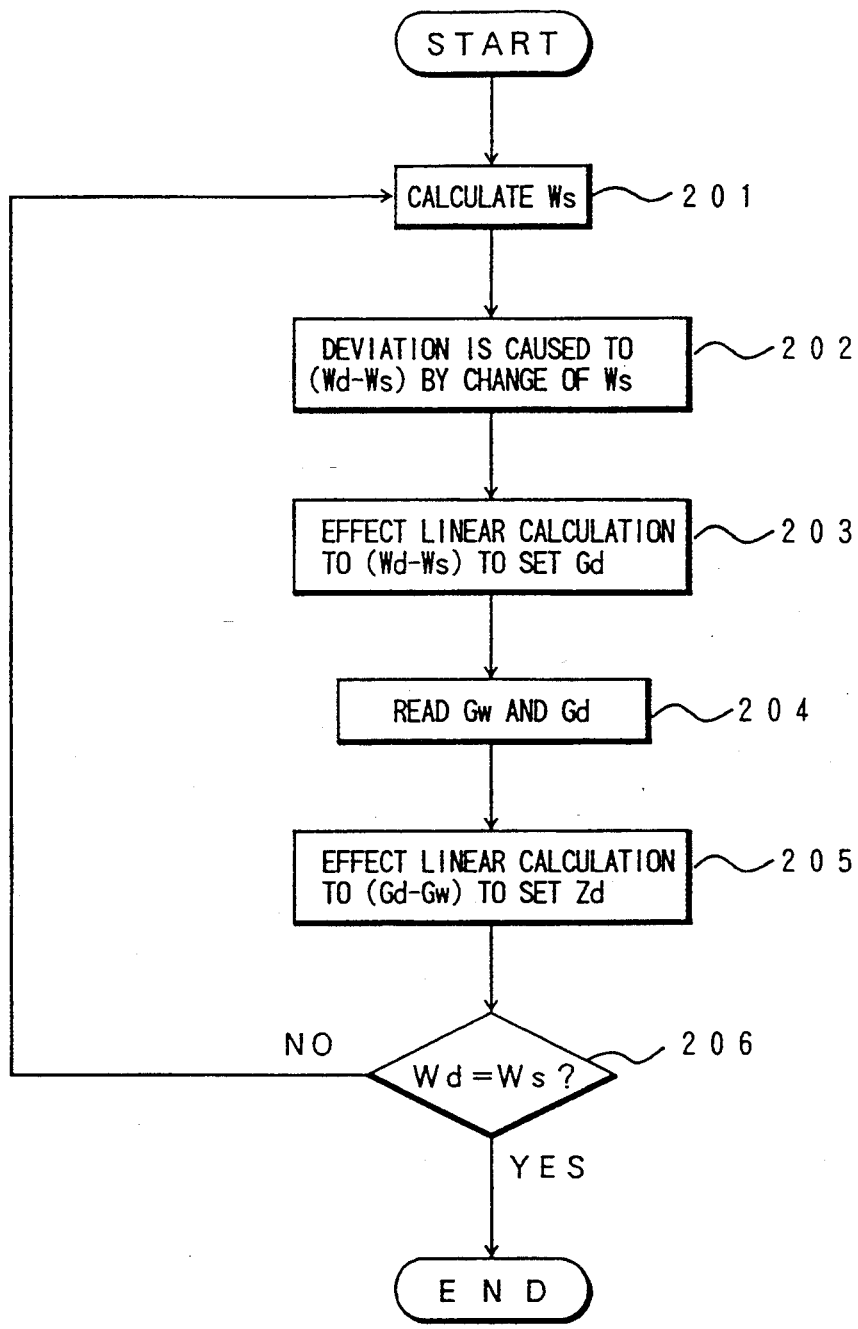
FIG. 24 is a flowchart showing a reactor burn-up compensation control flow of the nuclear power plant of the embodiment of FIG. 22.

The reactor burn-up compensation control is explained by way of the flowchart of FIG. 24. Referring to FIG. 24, rough adjustment of the compensation of the burn-up degree of the core 155 is performed by drawing out the reflector with a predetermined speed, but due to the characteristics of the reflector 156, the power of the fast reactor 154 is not maintained completely constant and the power is somewhat increased or decreased. In Step 201, the thermal power Ws of the steam generator 141 is calculated, and in Step 202, when the thermal power Ws changes, the deviation (Wd−Ws) is caused between the set power value Wd and the thermal power Ws of the steam generator. In Step 203, the deviation (Wd−Wd) is calculated in the thermal power control section 148b and the feed water flow rate signal Gd is set. In the next Step 204, the feed water flow rate signal Gd and the feed water flow rate Gw are inputted and stored into the flow rate control section 148c by the flow rate control section 148c. In Step 205, the deviation (Gd−Gw) between the feed water flow rate signal Gd and the feed water flow rate Gw is obtained in the flow rate control section 148c and the flow rate regulating valve opening degree signal Zd is set through a linear calculation, and the feed water flow rate regulating valve is controlled. In Step 206, it is discriminated whether the set power value Wd as the result of the control coincides with the thermal power Ws or not, and in the case of NO, the above processes are repeated till the power value Wd coincides with the thermal power Ws.

As described above, according to this embodiment, in the reactor burn-up compensation, since the thermal power Ws of the steam generator 141 can be controlled to a value corresponding to the set power value only by operating the feed water flow rate Gw, even if the failure of the power plant control unit 148 be caused, the possibility of erroneous draw-out of the control rod from the core 155 can be substantially prevented, thus performing the operation of the power plant stably.

Next, the generator load follow-up control will be described by way of the flowchart of FIG. 25. When the load of the generator 135 is lowered, the main steam governor 158 is closed. The main steam pressure is thereby increased and the turbine bypass valve 159 is opened to bypass the excess steam to the condenser 160. In order to lower the power of the fast reactor 154 in conformity with the load of the generator 135, the set power value Wd is gradually lowered by the power setter 153. In Step 211, the thermal power Ws is calculated by the thermal power calculation section 148a. In the next Step 212, a deviation (Wd−Ws) is caused between the lowered set power value Wd and the calculated thermal power Ws. In Step 213, the deviation (Wd−Ws) is obtained in the thermal power control section 148b and the feed water flow rate signal Gd is set through a linear calculation. In Step 214, the feed water flow rate Gw and the feed water flow rate signal Gd are inputted and stored by the flow rate control section 148c, and in Step 215, the deviation (Gd−Gw) between the feed water flow rate Gw and the feed water flow rate signal Gd is obtained and the flow rate regulating valve opening degree signal Zd is set to thereby control the feed water flow rate regulating valve 147. In Step 216, it is discriminated whether the set power value Wd as the result of the control coincides with the thermal power Ws or not, and in the case of NO, the above processes are repeated till the power value Wd coincides with the thermal power Ws.

Figure 26:
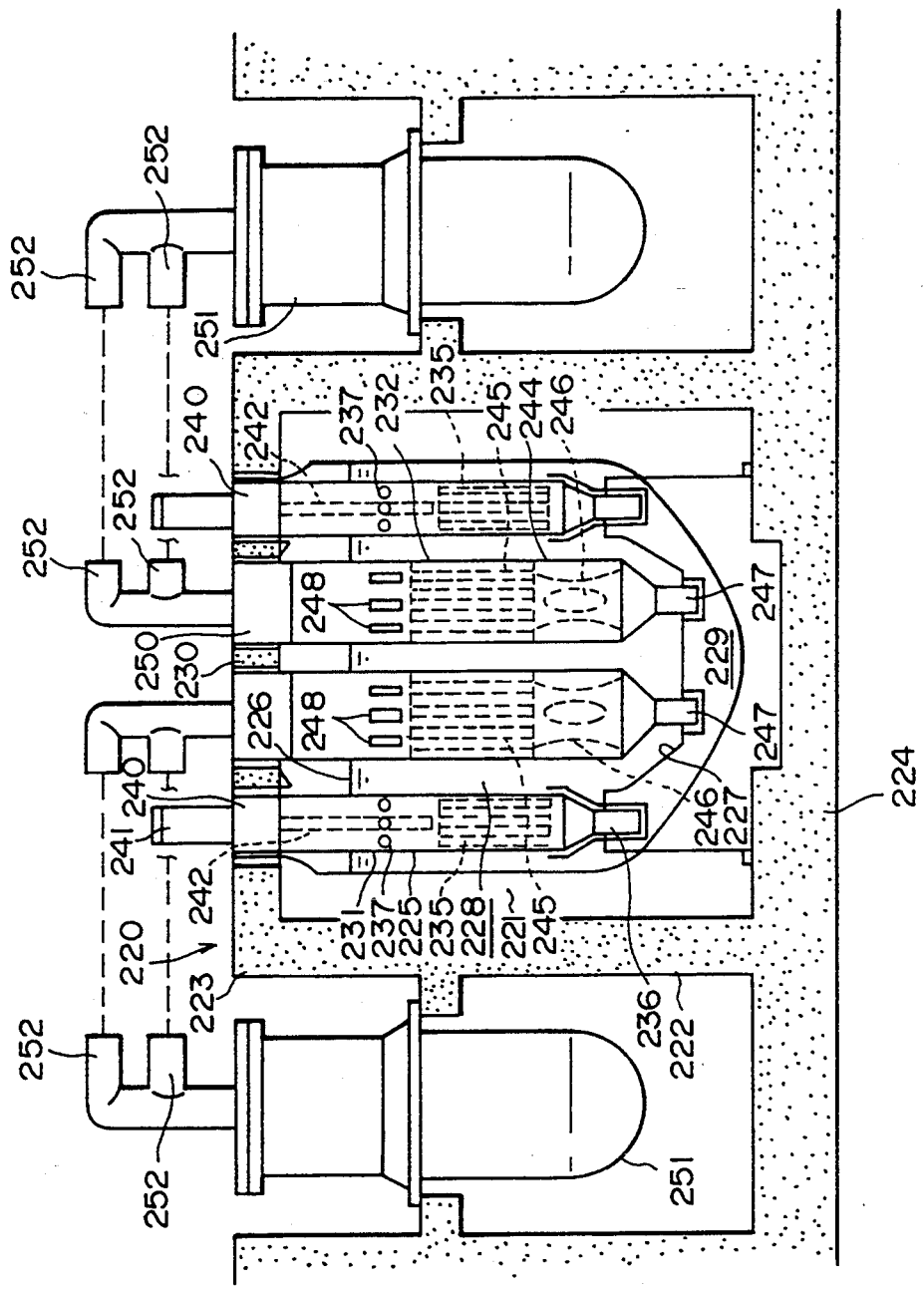
FIG. 26 is an elevational section of a reactor according to an embodiment of the present invention.

FIG. 26 shows a reactor provided with a reactor vessel in which a plurality of core vessels each accommodating a module core are accommodated.

A conventional liquid metal cooling type reactor accommodates single core in its reactor vessel, and according to large power requirement of the reactor, the reactor is enlarged in size with single core, resulting in complicated control of the core and, in case of an accident of a portion of the core, the accident affects entirely the large core operation, which in turn results in the shut-down of the reactor operation.

Furthermore, in the conventional reactor, since it is aimed to make large the core with maintaining single core, the core structure including, for example, a core support structure, is made large in size, and accordingly, hard labour, much time and troublesome working are required for workers or operators of the reactor at the time of removing or assembling the core structure for the purpose of periodical inspection, maintenance and the like.

In the removing working and the assembling working of the core support structure, it is necessary to carefully handle the core structure itself, retire the entire core structure externally of the reactor vessel and additionally locate a device for storing or discharging liquid metal as the primary coolant.

Furthermore, in the conventional reactor, the reactor is enlarged in size with maintaining single core, so that the power shut-down of the core also results in the stopping of the operation of the power plant itself, thus giving an economical damage. Still furthermore, since only the single core is disposed in the reactor, it is necessary to carry out the core designing or nuclear critical experiment every time in accordance with the power of the nuclear power plant, thus being inconvenient in evidencing the core characteristics.

The present invention was conceived in consideration of the above facts, and according to the present invention, the power of the nuclear power plant can be increased in combined arrangement of a plurality of core vessels and the easiness of the core control can be ensured even if the power of the power plant is increased.

FIG. 26 represents an embodiment of the present invention applied to a liquid metal cooling type tank type reactor. In this embodiment, a reactor chamber 221 is formed in a reactor building 220. The reactor chamber 221 is installed on a base mat 224 and enclosed by a biological shilding wall 222 made of concrete and a biological shilding ceiling wall 223 also made of concrete, and a reactor vessel 225 as a tank type primary coolant vessel is accommodated in the reactor chamber 220.

Liquid metal such as liquid metal sodium fills in the reactor vessel 225 as primary coolant 226, and the interior of the reactor pressure vessel 225 is divided into an upper plenum 228 and a lower high pressure plenum 229 by means of a pressure partition wall 227.

The reactor vessel 225 has a top opening which is covered by an upper cover 230 as a shielding plug, and the upper cover 230 is formed with through holes through which core vessels 231 and intermediate cooling machines 232 are perpendicularly arranged so as to be suspended into the reactor vessel through an upper mirror plate. The upper cover 230 further constitutes a portion of the biological shielding ceiling 223.

Figure 27:
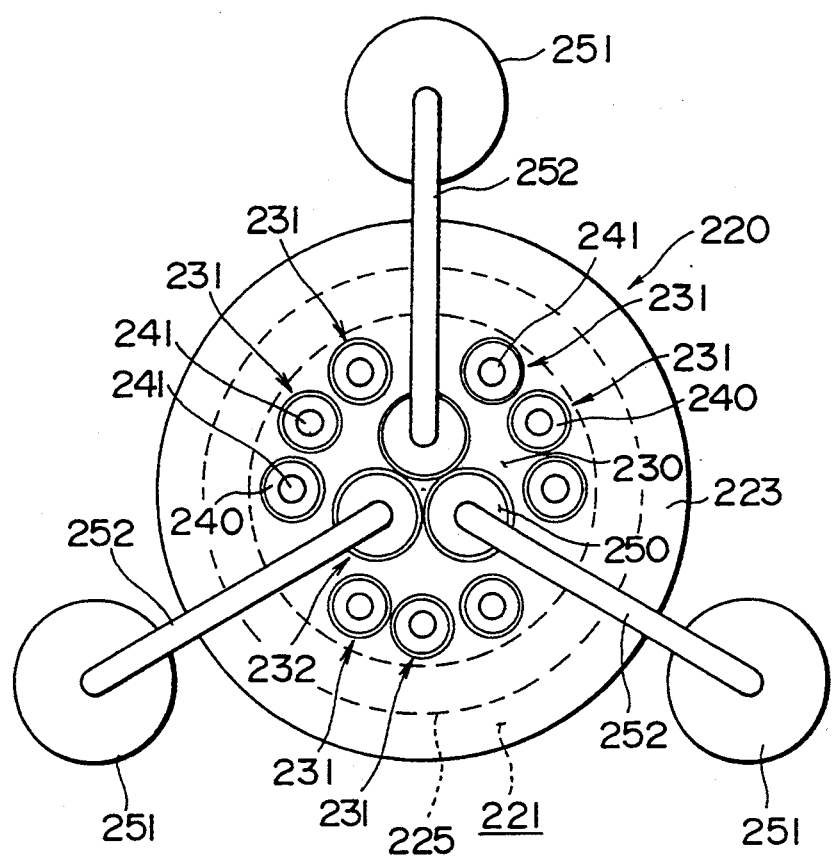
FIG. 27 is a plan view of the reactor shown in FIG. 26.

A plurality of, for example, nine, as shown in FIG. 27, core vessels 231 are arranged circularly along the inner peripheral wall of the reactor vessel 225, and one or a plurality of, for example, three, intermediate cooling machines 232 are arranged inside the circularly arranged core vessels 231.

In each of the core vessels 231, a core, i.e. module core, 235 composed of fuel rods and control rods is accommodated, and each of the core vessels 231 is provided with a shell having a lower portion to which a flow-in nozzle 236 is formed and an upper portion to which a flow-out port 237 is also formed. The flow-in nozzle 236 is fitted to an opening formed at an attaching protion of the pressure partition wall 227 and opened to the lower plenum 229, and the flow-out port 237 is opened to the upper plenum 228.

A core shielding plug 240 is attached to an upper opening of the core vessel 231 and a control rod driving mechanism 241 is disposed above the core shielding plug 240. The insertion or charging of the control rods 242 into the core 235 can be controlled by the control rod driving mechanism 241.

Each of the intermediate cooling machines 232 is provided with a cylindrical intermediate cooling vessel 244 in which an intermediate heat exchanger 245 for performing heat exchanging operation between the primary coolant and the secondary coolant and a circulation pump 246 for forcibly circulating the primary coolant are accommodated. The circulation pump 246 is composed of an electromagnetic pump which is disposed below the intermediate heat exchanger 245.

A flow-out nozzle 247 is formed to the lower portion of the circulation pump 246 and the flow-out nozzle 247 is fitted with and supported by the attachment opening of the pressure partition wall 227 so as to be opened to the inside of the lower high pressure plenum 229. The intermediate cooling machine 244 forms, at its upper portion, a flow-in port 248 which is opened to the inside of the upper plenum 228.

An intermediate cooling machine shielding plug 250 is fitted to the upper opening of the intermediate cooling vessel 244, and a secondary coolant flow-in and -out tube 252 connected to a steam generator 251 is disposed above the shielding plug 250. The flow-in and-out tube 252 connects the steam generator 252 and the intermediate heat exchanger 245 to thereby constitute a closed circulation loop for circulating the secondary coolant. The steam generator generates steam utilized for driving a steam turbine, not shown.

When the ractor of this embodiment is operated, the primary coolant flows from the lower high pressure plenum 229 of the reactor vessel 225 into the core vessel 231 through the flow-in nozzle 236. The thus fed primary coolant 226 is heated through nuclear reaction heat during the passing through the core 235 in each of the core vessels 231 and then discharged into the upper plenum 228 through the flow-out port 237.

The primary coolant of high temperature guided to the upper plenum 228 is then guided to the intermediate heat exchanger 245 through the flow-in port 248 of the intermediate cooling machine 232 and passes tubes of the intermediate heat exchanger 245. At this time, the heat exchanging operation is carried out between the primary coolant and the secondary coolant, thus the primary coolant being cooled. The primary coolant transferring the heat to the secondary coolant and reduced in its temperature is reduced in its pressure by the electromagnetic pump and then returns into the high pressure plenum, i.e. lower plenum, 229 through the flow-out nozzle 247.

On the other hand, the secondary coolant heated by the intermediate heat exchanger 245 in the intermediate cooling machine 232 fed to the steam generator 251 through the flow-in and -out tube 252 and heats therein the water, thus generating the steam for driving the steam turbine.

The secondary coolant cooled by heating the water in the steam generator returns to the intermediate heat exchanger 245 of the intermediate cooling machine 232 through the flow-in and out tube 252.

In the reactor of this embodiment, in a case where a plurality of core vessels 231 as the primary coolant vessels are accommodated in the reactor vessel 225 and it is assumed that the thermal power per one module core 235 disposed in the core vessel 231 is 100000 KW as a small core, the total thermal power of the reactor having the reactor vessel in which nine core vessels 231 are accommodated is $9 \times 100000 = 900000$ KW, which is large power as a single reactor power, will be obtained. Accordingly, different from a conventional reactor of liquid metal cooling type having a reactor in which single large core is accommodated, the reactor of the present embodiment is composed of a plurality of combined small cores, each of which is relatively easily handled or managed, and a large power as one reactor can be obtained with maintaining the characteristic feature of a small sized core 235, which can be easily operated and controlled.

For example, in the case of a small sized core having the thermal power of 100000 KW per one core 235, the outer diameter of the core vessel 231 can be made within 1.5 m.

For the reason described above, even in a case where a plurality of core vessels 231 are disposed in the reactor vessel 225 to thereby increase the reactor power as single reactor, the enlargement in size of the core structure such as core support structure can be avoided and a small sized core structure can be provided, and accordingly, the removal or exchanging thereof can be easily made. Furthermore, according to the arrangement of the core vessels 231 along the inner peripheral wall of the reactor vessel 225, the accessibility to the core vessels 231 can be improved. Particularly, at the upper surface of the biological shielding ceiling wall 223, the accessibility of the fuel exchanging device to the respective module cores 235 and the accessibility for the removal or exchanging of the respective core vessels 231 including the core support structure can be also improved, thus being advantageous.

Furthermore, since the intermediate cooling machine 232 is constructed in combination of the intermediate heat exchanger 245 and the circulation pump 246, a space for arranging machineries or equipments in the inside area of the array of the core vessels 231 can be sufficiently ensured.

Figure 28:
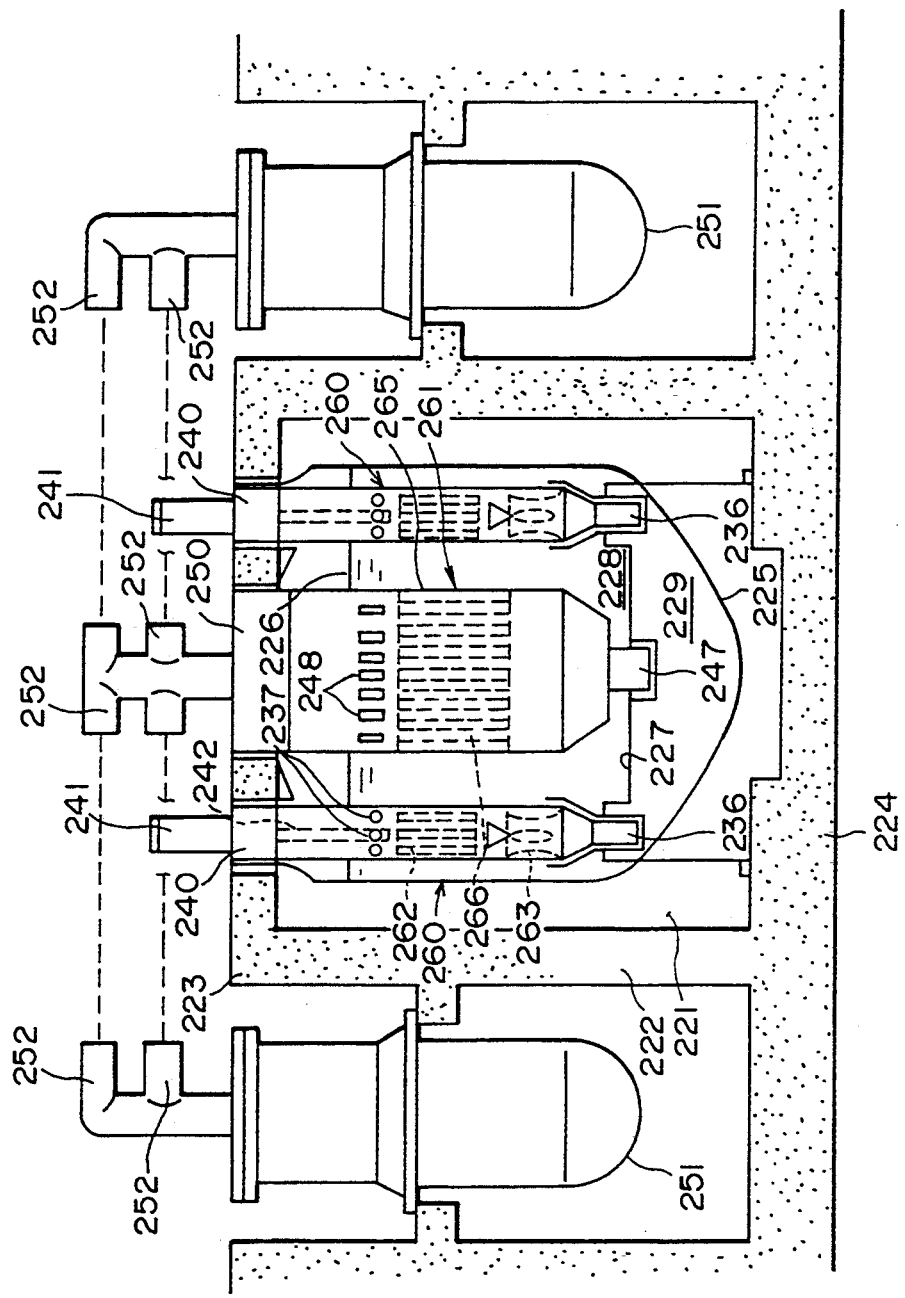
FIG. 28 is a view similar to FIG. 26, showing another embodiment of a reactor of the present invention.
Figure 29:
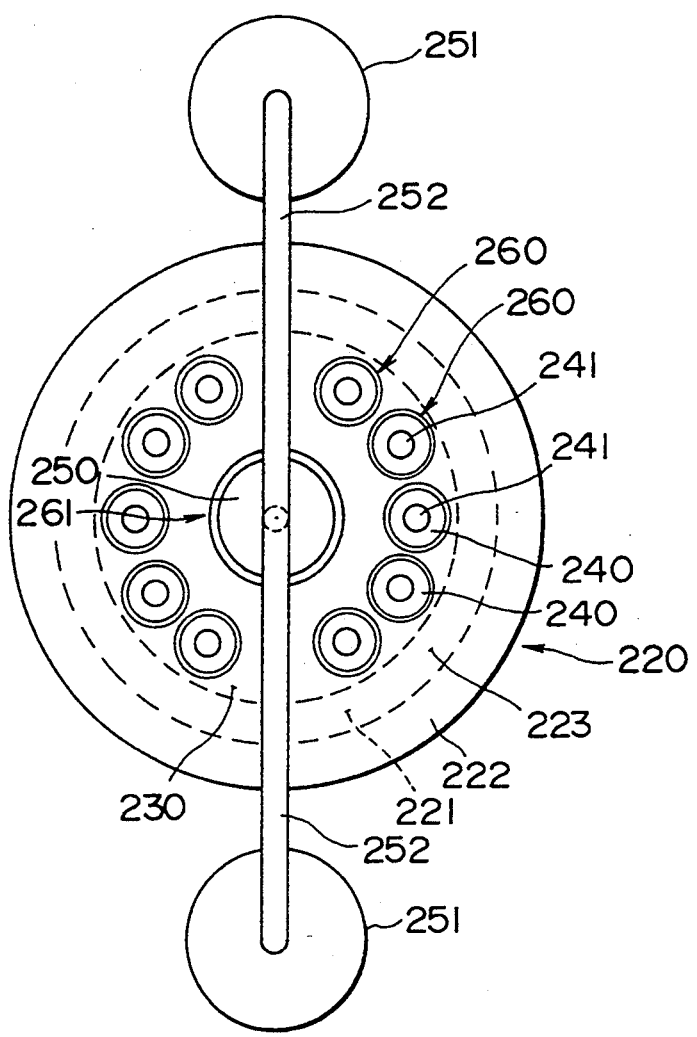
FIG. 29 is a plan view of the reactor shown in FIG. 28.

FIGS. 28 and 29 represent a reactor of another embodiment according to the present invention.

This embodiment differs from that of FIG. 26 in a point that the installed numbers and the structures of the core vessels 260 and the intermediate cooling machines 261 disposed in the reactor vessel are different, and other arrangements or structures are substantially the same as those of the embodiment of FIG. 26, and the like reference numerals are added to equipments or units corresponding to those of FIG. 26.

In this embodiment of FIGS. 28 and 29, a plurality of, for example, ten core vessels 260 are arranged circumferentially along the inner peripheral wall surface of the reactor vessel 225 and, in each of the core vessels 260, a core 262 is disposed to an upper portion thereof and an electromagnetic pump as circulation pump 263.

The core vessel 260 is provided with a flow-in nozzle 236 disposed below the circulation pump 263 and the flow-in nozzle 236 is fitted to and supported by an opening formed to an attaching portion of the pressure partition wall 227 to thereby establish the communication of the core vessel 260 with the lower plenum 229 through the flow-in nozzle 236.

The core vessel 260 is also provided with a flow-out port 237 above the core 262, and the primary coolant increased in its pressure by the circulation pump 263 and heated by the core 262 is guided to the upper plenum 228 through the flow-out port 237.

In the meantime, one or plurality of intermediate cooling machines 261 are arranged inside the core vessels 260 circumferentially along the inner peripheral wall of the reactor vessel. The intermediate cooling machine 261 is constructed as an intermediate heat exchanger 266 accommodated in a intermediate cooling vessel 265, and a flow-out nozzle 247 is formed below this intermediate heat exchanger 266 and a flow-out port 248 is disposed thereabove.

According to the structure of the reactor of this embodiment described above, the primary coolant of high temperature guided to the upper plenum 228 is then guided to the intermediate heat exchanger 266 through the flow-in port 248 of the intermediate cooling machine 261, and in the intermediate heat exchanger 266, the heat exchanging operation is performed between the primary coolant 226 and the secondary coolant. The primary coolant 226 cooled through the heat exchanging operation is guided into the lower plenum 229 through the flow-out nozzle of the intermediate cooling machine 261 and then returns into the core vessel 260 through the flow-in nozzle 236.

Then, the secondary coolant having a temperature increased through the heat exchanging operation in the intermediate heat exchanger 266 is fed to the steam generator 251 through the flow-in and -out tube 252 and heats the water therein to thereby generate the steam which in turn drives the steam turbine, not shown. The secondary coolant reduced in its temperature after the heating of the water again returns to the intermediate heat exchanger 266 through the flow-in and -out tube 252, thus constituting a closed circulation loop of the secondary coolant.

According to the reactor of this embodiment, in addition to the functions and effects of the embodiment of FIGS. 26 and 27, there can attain further function such that, in a case where an abnormality is caused to the circulation pump 263 provided for each of the core vessels 260, the operation of only the core 260 related to that circulation pump 263 is stopped by the control rod driving mechanism 241 and other cores can be operated continuously as they are.

Figure 30A:
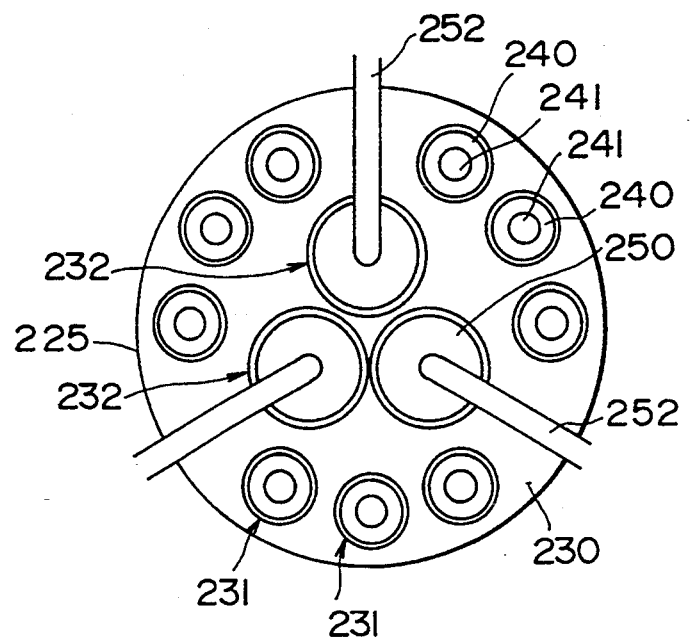
FIGS. 30A and 30B are plan views showing examples of changing reactor power in the reactor of the present invention.
Figure 30B:
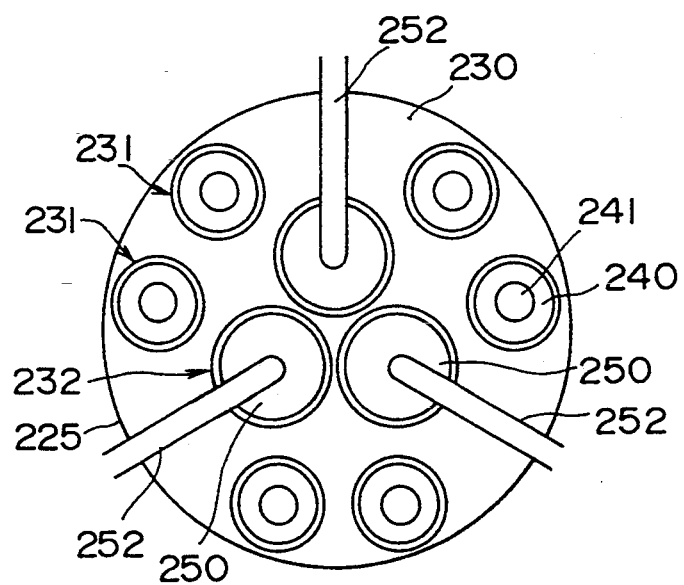

FIGS. 30A and 30B are plan views of an upper portion of reactors according to further embodiments of the present invention and show examples of reactor power modifications. In the modification of FIG. 30A, nine core vessels 231 having the same design are accommodated in the reactor vessel 225 and in the modification of FIG. 30B, six core vessels 231 are accommodated.

In these embodiments, the respective core vessels 231 are constructed with the same design, and for example, assuming that the thermal power of one core reactor is 100000 KW, the single reactor power of 900000 KW can be obtained by the reactor of FIG. 30A and the single reactor power of 600000 KW can be obtained by the reactor of FIG. 30B. Accordingly, in the assumption of the same core design, various reactor power can be selected by the combination of the numbers of the evidenced module cores.

Further, it is to be noted that in the above explanation, the embodiments of evidenced small sized module cores having the same design were explained, it may be possible to preliminarily prepare evidenced small sized cores having various thermal powers.

Figure 31:
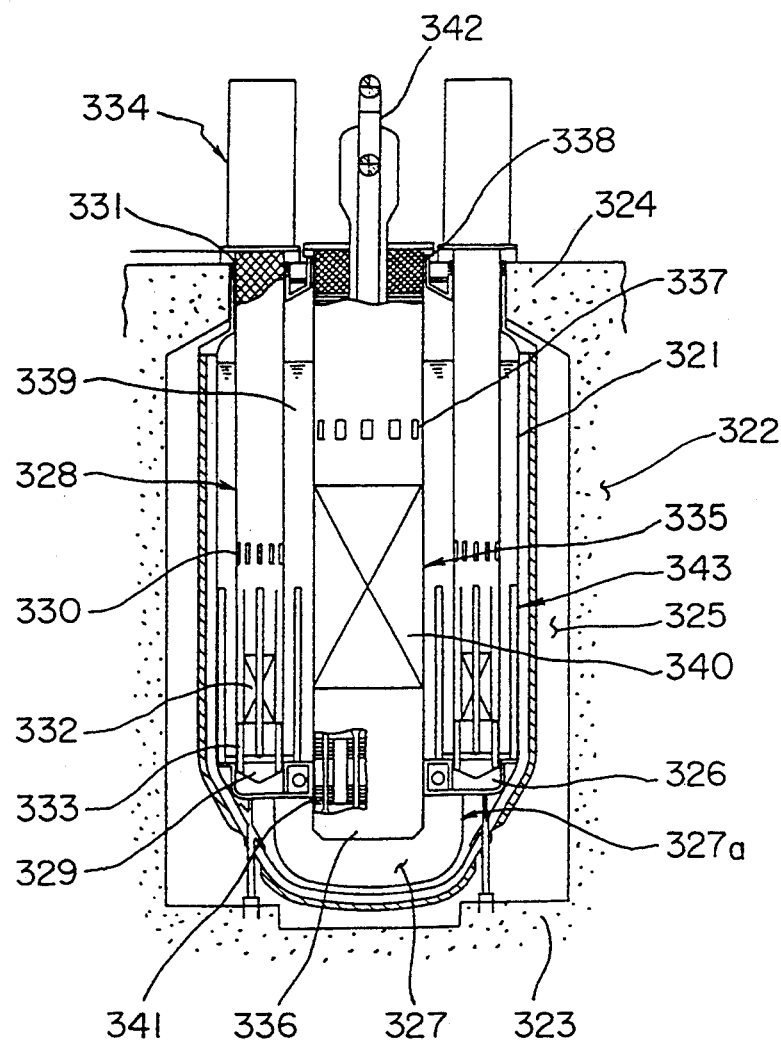
FIG. 31 is an elevational section of a reactor according to a further embodiment of the present invention.

FIG. 31 shows a reactor of reflector control type capable of controlling reactivity of a core by vertically moving a neutron reflector and capable of operating the reactor without changing fuel for a long time, maintaining void reactivity negative during the reactor operation period and obtaining a large power.

Referring to FIG. 31, a primary coolant vessel 321 is installed in a reactor chamber 325 surrounded by a biological shielding wall 322, a buidling base mat 323 and a biological shielding ceiling 324.

Within the primary coolant vessel 321, a high pressure plenum 327 formed by a pressure partition wall structure 326 is disposed at the bottom portion thereof and a plurality of core vessels 328 are perpendicularly arranged circumferentially along the side wall.

Each of these core vessels 328 is provided at its lower portion with a core vessel flow-in nozzle 329 and a core vessel flow-out port 330 is also formed above a shell portion thereof. The core vessel 328 has an upper opening to which a core shielding plug 331 is mounted. A core 332 composed of fuel rods and a reflector 333 is accommodated inside the core vessel 328 and a reflector driving mechanism 334 is disposed above the core shielding plug 331.

One or plurality of intermediate cooling machines 335 are perpendicularly arranged in an inside area of the circularlly arranged core vessels 328.

As shown in FIG. 31, each of these intermediate cooling machines 335 is provided with flow-out nozzle 336 at its lower portion and a flow-in port 337 at an upper portion of a shell thereof, and a shielding plug 338 is also mounted to an upper opening portion of the intermediate cooling machine 335. The interior of the intermediate cooling machine 335 is composed of an intermediate heat exchanger 340 disposed to an upper portion therein for carrying out the heat exchanging operation between the primary coolant and the secondary coolant and a primary electromagnetic pump 341 disposed to a lower portion therein for circulating the primary coolant 339. A secondary coolant flow-in and -out tube 342 for heating a steam generator, not shown, is arranged above the intermediate cooling machine shielding plug 338.

The biological shielding ceiling 324 is formed with through holes for inserting the core vessels 328 and the intermediate cooling machines 335 into the primary coolant vessel 321 through the upper mirror plate of the primary coolant vessel 321 so that the core vessels 328 and the intermediate cooling machines 335 can be inserted or removed through these through holes.

The high pressure plenum 327 composed of the pressure partition wall structure 326 is provided with an opening into which the flow-out nozzle 336 of the intermediate cooling machine is fitted, thereby guiding the primary coolant 339 to an annular core distribution plenum 327a from the high pressure plenum 327. The annular core distribution plenum 327a is formed with an opening into which the core vessel flow-in nozzle 329 is fitted. The primary coolant 339 is fed to the flow-in nozzle 329 from the core distribution plenum 327a and discharged through the flow-out port 330 of the core vessel after being heated during the passing through the core 332. Thereafter, the primary coolant 339 is fed into the intermediate cooling machine through its flow-in port 337 and passes the tube bundles in the intermediate heat exchanger 340 and, during this passing, the heat exchanging operation is carried out between the primary coolant and the secondary coolant to transfer the heat to the secondary coolant. After the pressure increasing by the primary electromagnetic pump 341, the primary coolant 339 returns to the high pressure plenum 327 through the flow-out nozzle 336 of the intermediate cooling machine 335.

Neutron shields 343 are disposed to the outer peripheral portion of the cores 332 of the respective core vessels 328 to prevent them from nuclearly interferring with each other.

As described above, for example, assuming the location of single small sized core 332 having a thermal power of 100000 KW, for the reactor of this embodiment provided with six cores 332, a large thermal power of 6×100000 KW=600000 KW can be obtained. Furthermore, each core 332 is small sized, so that a reactor capable of keeping negative the void reactivity without exchanging the fuel for a long time.

Figure 32:
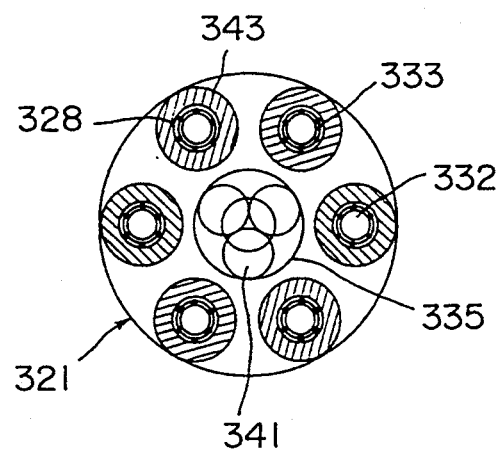
FIG. 32 is a horizontal, i.e. cross, sectional view at a core location level of the reactor of FIG. 31.
Figure 33:
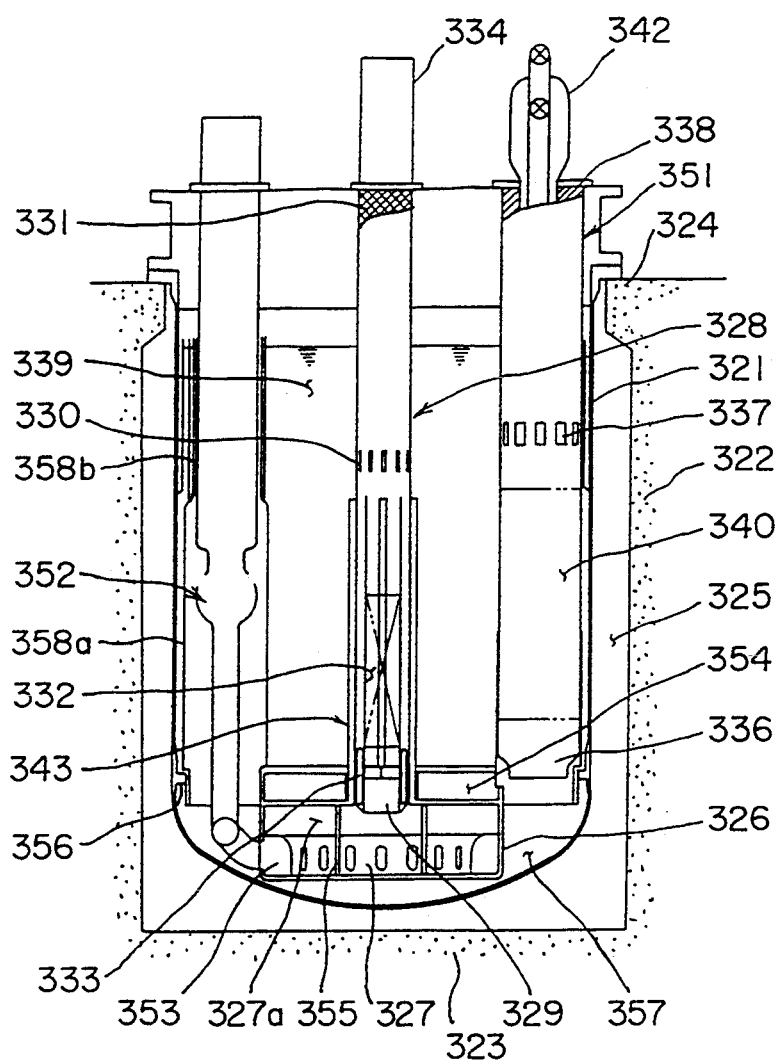
FIG. 33 is an elevational section of a reactor according to a still further embodiment of the present invention.
Figure 34:
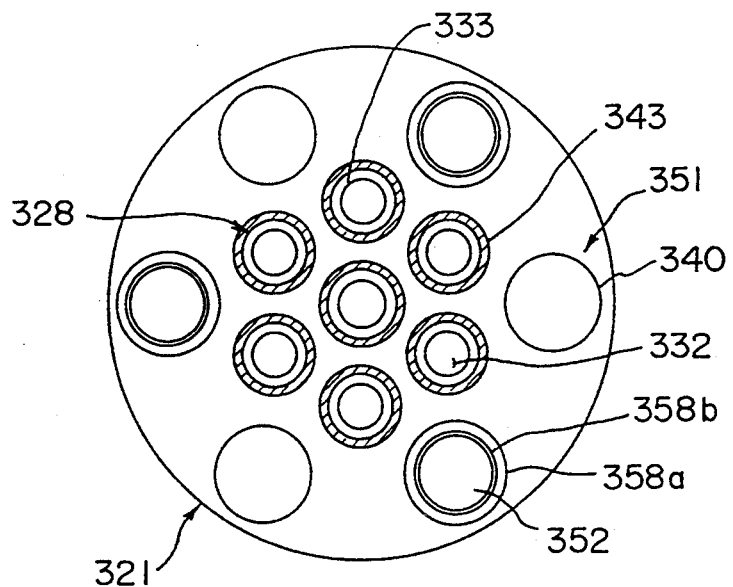
FIG. 34 is a horizontal, i.e. cross, sectional view at a core location level of the reactor of FIG. 33.

FIGS. 33 and 34 represent anther embodiment of a reactor in relation to the embodiment of FIGS. 31 and 32.

Referring to FIGS. 33 and 34, a plurality of, for example, seven, core vessels 328 is perpendicularly arranged at the central portion in the primary coolant vessel 321, and for example, three intermediate cooling machines 351 and three primary mechanical pumps 352 are also perpendicularly arranged in an annular area outside the arrangement of the core vessels 328 with circemferentially equal space with each other.

Each of the intermediate cooling machines 351 has a structure similar to that of the former embodiment but excluding the primary electromagnetic pump 341. The primary mechanical pump 352 is directly connected to the pressure partition wall structure 326 so as to guide the primary coolant 339 to the core distribution plenum 327a after rectifying the same by a coolant introducing header 353. The core distribution plenum 327a is formed with an opening into which the flow-in nozzle 329 of the core vessel is fitted, and the core distribution plenum 327a and the low pressure plenum 354 are mutually communicated with each other through a pressure reducing coupling tube 355.

The lower mirror plate of the primary coolant vessel 321 and the pressure partition wall support plate 356 constitutes a pump suction plenum 357 which is formed with an opening into which the flow-out nozzle 336 of the intermediate cooling machine. Stand pipes 358a and 358b constituting a suction port of the primary mechanical pump 352 are also connected to the pump suction plenum 357.

The other structure of the reactor of this embodiment of FIGS. 33 and 34 are substantially the same as those of the former embodiment of FIGS. 31 and 32.

According to the structure described above, the primary coolant 339 is fed to the flow-in nozzle 329 of the core vessel from the high pressure plenum 327, heated during the passing through the core 332 and then discharged through the flow-out port 330 of the core vessel. Thereafter, the primary coolant 339 is sucked through the flow-in port 337 of the intermediate cooling machine and transfers its heat to the secondary coolant during the passing through the tube bundles in the intermediate heat exchanger 340 through the heat exchanging operation therebetween. The primary coolant after cooled through the heat exchanging operation is discharged to the pump suction plenum through the flow-out nozzle 336 of the intermediate cooling machine and then returns to the core distribution plenum 327a by the actuation of the primary mechanical pump 352.

According to this embodiment, too, a large power can be obtained as in the former embodiment and the void reactivity can be maintained negative without exchanging the fuel for a long time. In this embodiment, even in an alternation of the primary mechanical pump 352 to the electromagnetic pump, substantially the same effects will be attained.

Although in the former embodiments, six core vessels 328 are arranged in the primary coolant vessel 321 along the inner circumferential periphery thereof or seven core vessels 328 are arranged therein at the central portion thereof, further modifications or changes may be made for attaining substantially the same functions and effects. Such modifications are explained hereunder with reference to the illustration of plan views of FIGS. 35 to 42.

Figure 35:
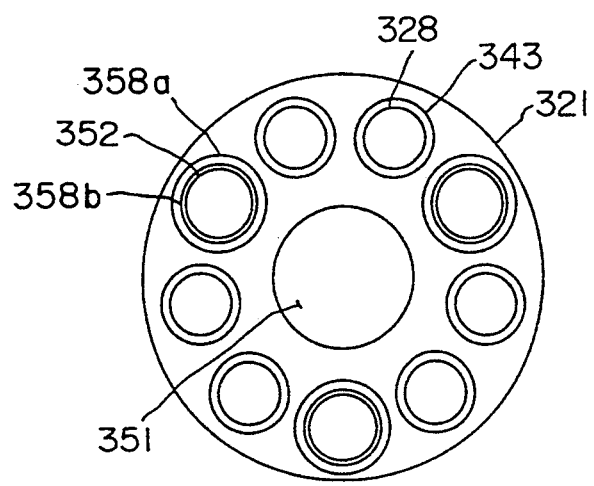
FIG. 35 is a view similar to that of FIG. 34, in which a reactor has a structure different from that of FIG. 34.

First, in a reactor of FIG. 35, one intermediate cooling machine 351 is arranged at the central portion of the primary coolant vessel 321, three primary mechanical pumps 352 are disposed at an outer peripheral side thereof, and respectively two, totally six, core vessels 328 are arranged between adjacent two primary mechanical pumps 352.

Figure 36:
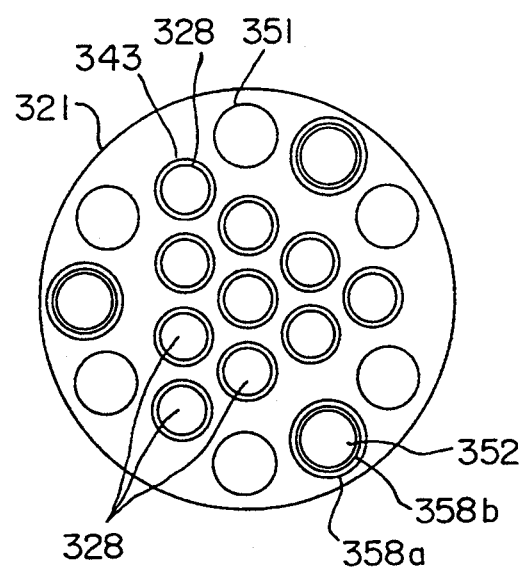
FIG. 36 as a view similar to that of FIG. 34, in which a reactor has another structure different from that of FIG. 34.

In a reactor of FIG. 36, one intermediate cooling machine 351 is arranged at the central portion of the primary coolant vessel 321, six core vessels are disposed at an outer peripheral side thereof, and further three core vessels 328 are arranged outside the former six core vessels 328. Six intermediate cooling machines 351 and the primary mechanical pumps 352 are further disposed at the outer peripheral portion thereof.

Figure 37:
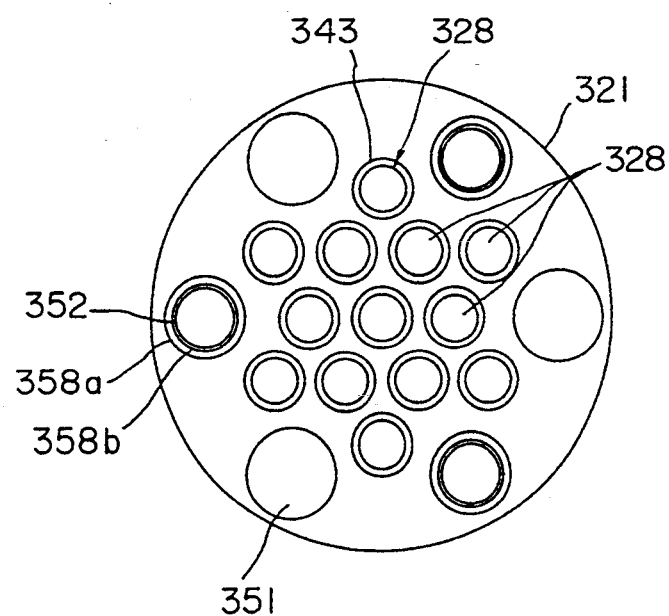
FIG. 37 is a view similar to that of FIG. 34, in which a reactor has a further structure different from that of FIG. 34.

In a reactor of FIG. 37, thirteen core vessels 328 are disposed at the central portion of the primary coolant vessel 321 and three intermediate cooling machines 351 and three primary mechanical pumps 352 are arranged to the outer peripheral portion thereof.

Figure 38:
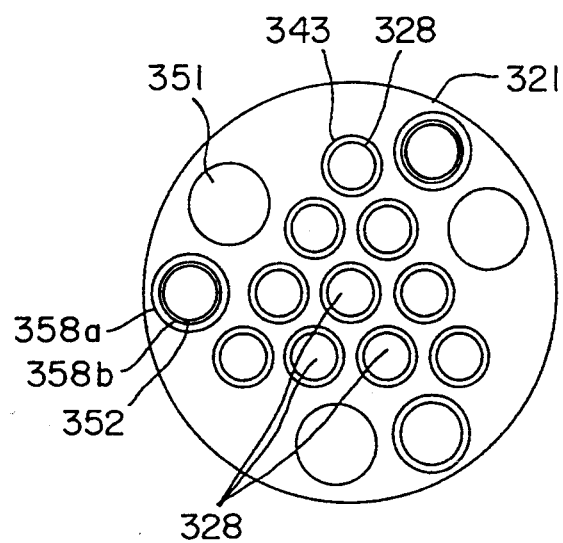
FIG. 38 is a view similar to that of FIG. 34, in which a reactor has a still further structure different from that of FIG. 34.

In a reactor of FIG. 38, seven core vessels 328 are arranged at the central portion of the primary coolant vessel 321, further three core vessels 328 are disposed outside thereof, and three intermediate cooling machines 351 and three primary mechanical pumps 352 are arranged further outside thereof.

Figure 39:
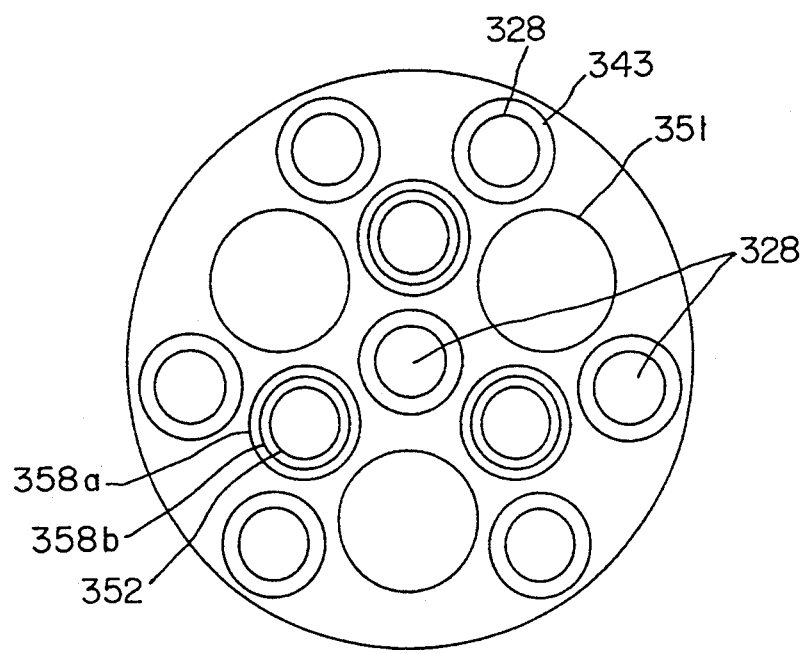
FIG. 39 is a view similar to that of FIG. 34, in which a reactor has a still further structure different from that of FIG. 34.

In a reactor of FIG. 39, one core vessel 328 is disposed at the central portion of the primary coolant vessel 321, three primary mechanical pumps 352 are arranged outside the core vessel 328, and three intermediate cooling machines 351 are disposed at the outer peripheral portion thereof. Further six core vessels 328 are arranged outside the arrangement of the intermediate cooling machines 351.

Figure 40:
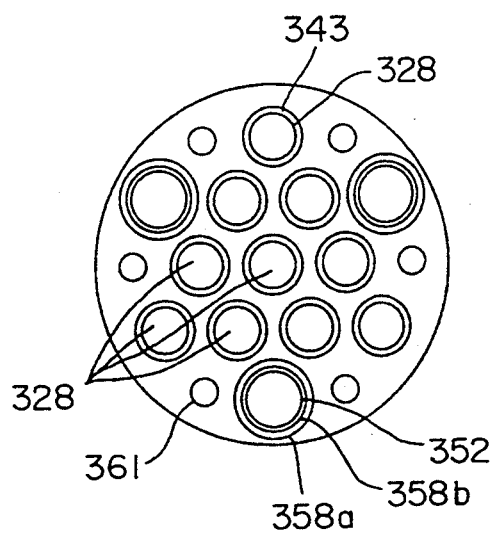
FIG. 40 is a view similar to that of FIG. 34, in which a reactor has a still further structure different from that of FIG. 34.

In a reactor of FIG. 40, seven core vessels 328 are arranged at the central portion of the primary coolant vessel 321 and three core vessels are further disposed to the outer periphery thereof. Three primary mechanical pumps 352 are arranged further outside the core vessels 328 and six core tubes 361 are arranged further outside the primary mechanical pumps 352.

Figure 41:
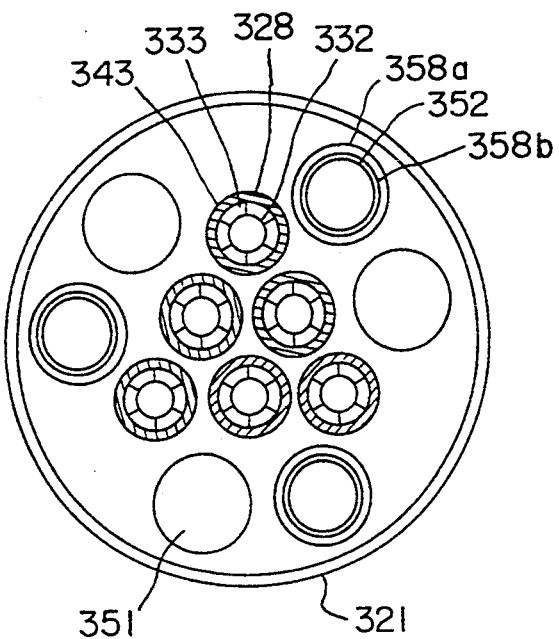
FIG. 41 is a view similar to that of FIG. 34, in which a reactor has a still further structure different from that of FIG. 34.

In a reactor of FIG. 41, six core vessels 328 are arranged at the central portion of the primary coolant vessel 321, three intermediate cooling machines 351 are disposed outside the core vessels 328, and three primary mechanical pumps 352 are further disposed to the outer periphery thereof.

Figure 42:
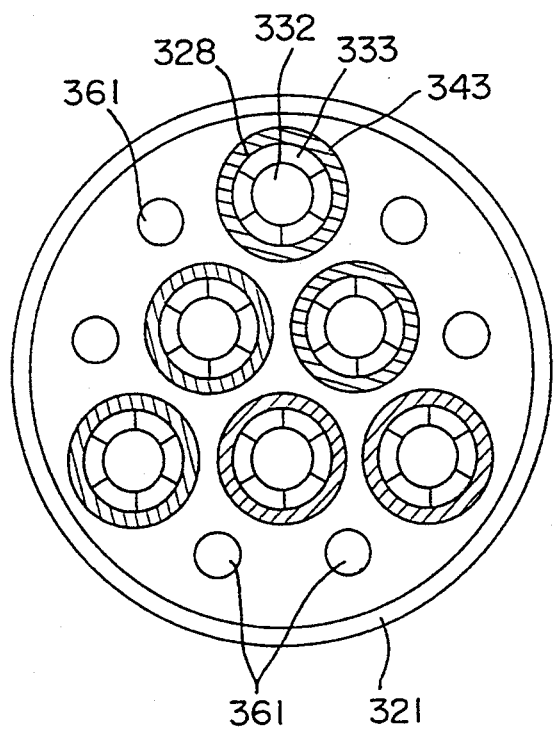
FIG. 42 is a view similar to that of FIG. 34, in which a reactor has a still further structure different from that of FIG. 34.

In a reactor of FIG. 42, three core vessels 328 are arranged at the central portion of the primary coolant vessel 321, further three core vessels are disposed to the outer periphery thereof, and six core tubes 361 are arranged further outside thereof.

Figure 43:
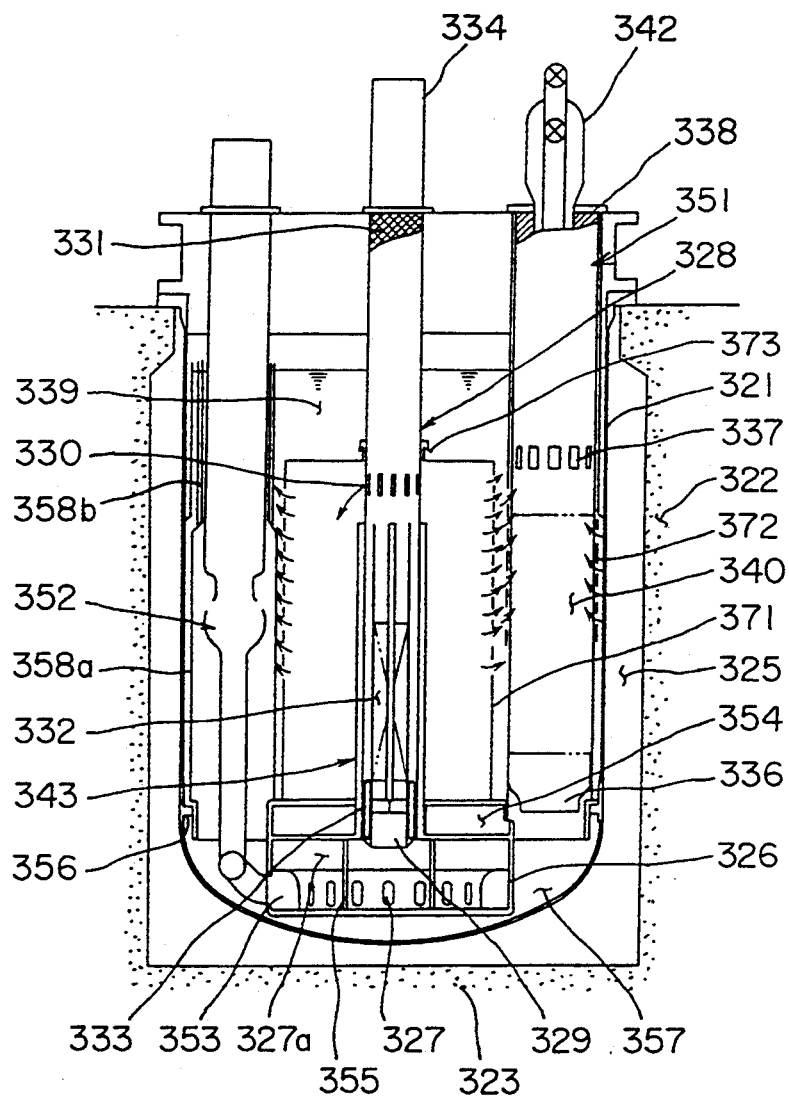
FIG. 43 is a view similar to that of FIG. 33 but related to a reactor of a still further embodiment of the present invention.

FIG. 43 shows a further embodiment of a reactor according to the present invention, in which a porous rectifying cylinder 371 for the core and a porous rectifying cylinder 372 for the intermediate heat exchanger are further disposed in addition to the embodiments described above.

Namely, referring to FIG. 43, the porous rectifying cylinder 371 for the core is concentrically arranged with the primary coolant vessel 321 so as to cover all the core vessels 328 in the primary coolant 339. This porous rectifying cylinder 371 is provided with a penetrating portion for the respective core vessels 328 and a seal mechanism 373 is provided for this penetrating portion to seal the communication between the outside and the inside of the rectifying cylinder 371 for the core. The primary coolant 339 of high temperature flown out from the flow-out port 330 of the core vessel 328 is dispersed through a plurality of holes formed to the peripheral surface of the rectifying cylinder 371.

On the other hand, the porous rectifying cylinder 372 for the intermediate heat exchanger is mounted to the outer peripheral portion of each of the respective intermediate cooling machines 351, and a plurality of holes are formed to the outer peripheral surface thereof at portions immersed in the primary coolant 339. The lower end of the rectifying cylinder 372 is opened to the primary coolant 339. The primary coolant 339 flown out from the porous rectifying cylinder 371 for the core is guided to the flow-in port 337 of the intermediate cooling machine 351 through the holes and lower end opening of the porous rectifying cylinder 372 for the intermediate heat exchanger, thereby suppressing the flow velocity of the primary coolant 339.

The other structures or arrangements of the reactor of this embodiment is substantially the same as those of the former embodiments, and the functions and effects are also the same as those of thereof.

As described above, since the flow velocity of the primary coolant 339 can be suppressed by the location of both the porous rectifying cylinders 371 and 372, the gas involving at the free liquid surface of the primary coolant can be prevented and, accordingly, the vibration of the liquid surface thereof can be reduced, thus realizing a stable coolant flow condition.

The reactor of this embodiment can be applied to reactors other than those of the embodiments described above with like functions and effects.

Figure 44:
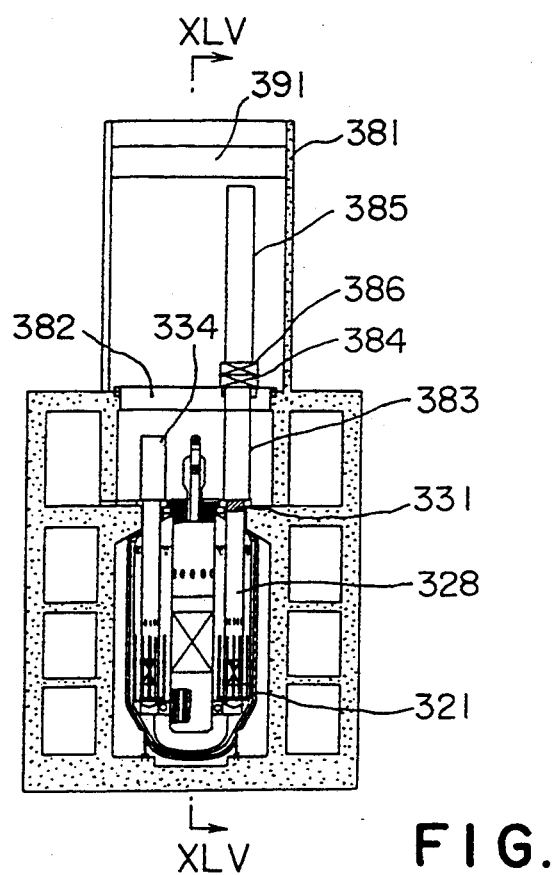
FIG. 44 is an elevational section showing a reactor building according to an embodiment of the present invention.
Figure 45:
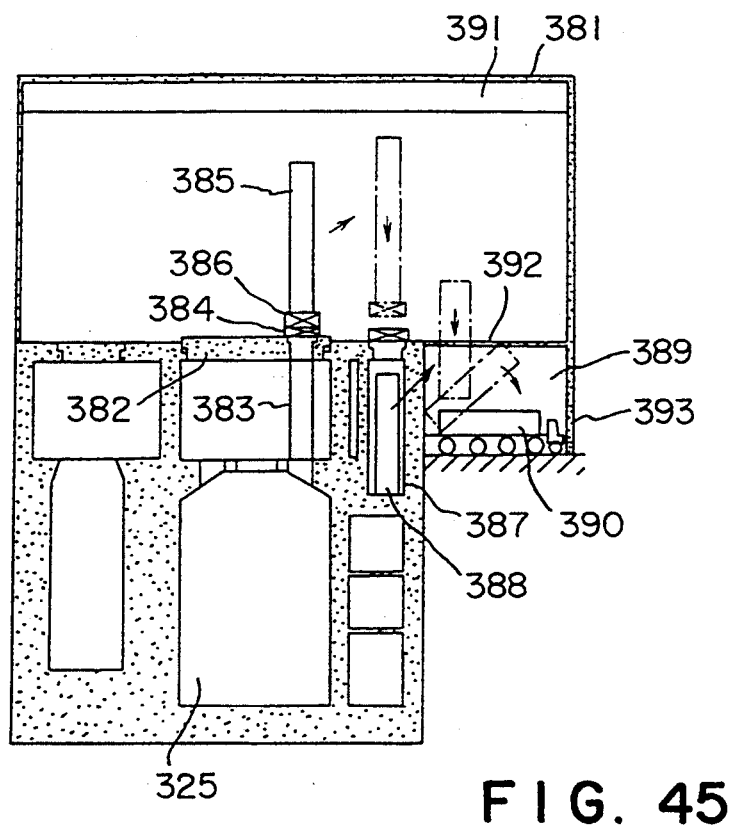
FIG. 45 is a sectional view taken along the line IVX-V—IVXV of FIG. 44.
Figure 46:
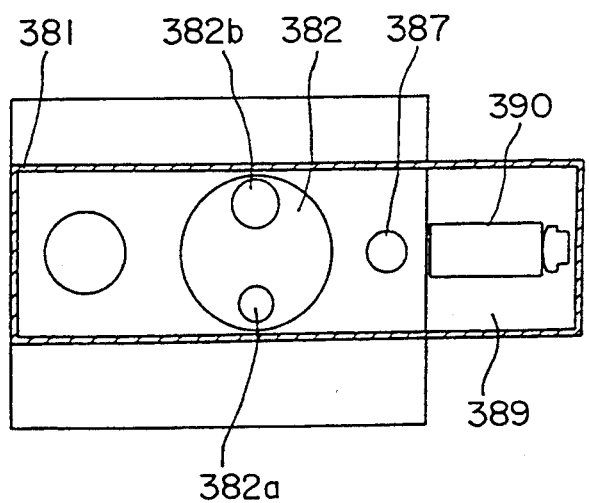
FIG. 46 is a plan view showing a fuel exchanging confinement.
Figure 47:
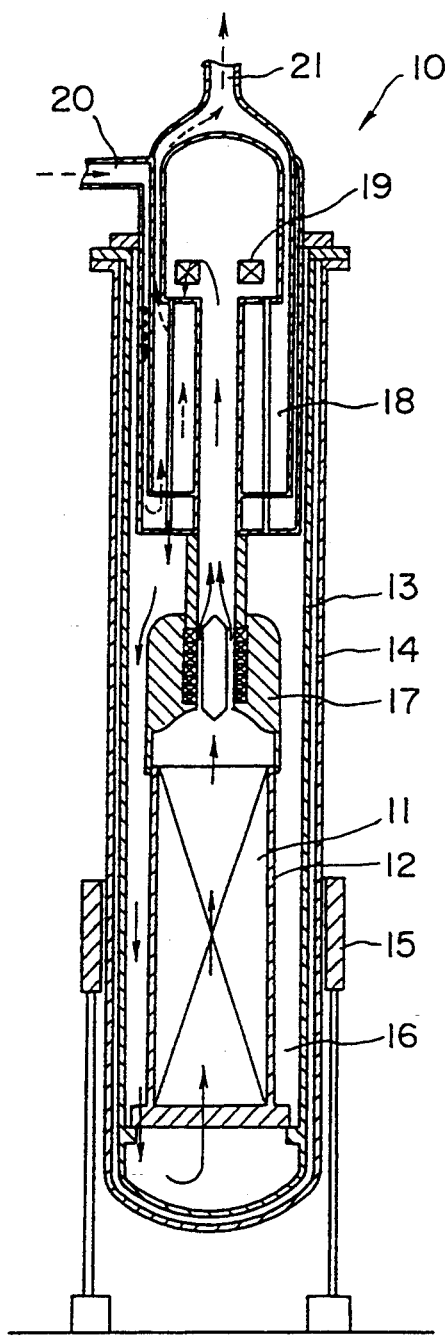
FIG. 47 is an elevational section showing one example of a fast reactor of prior art structure.
Figure 48:
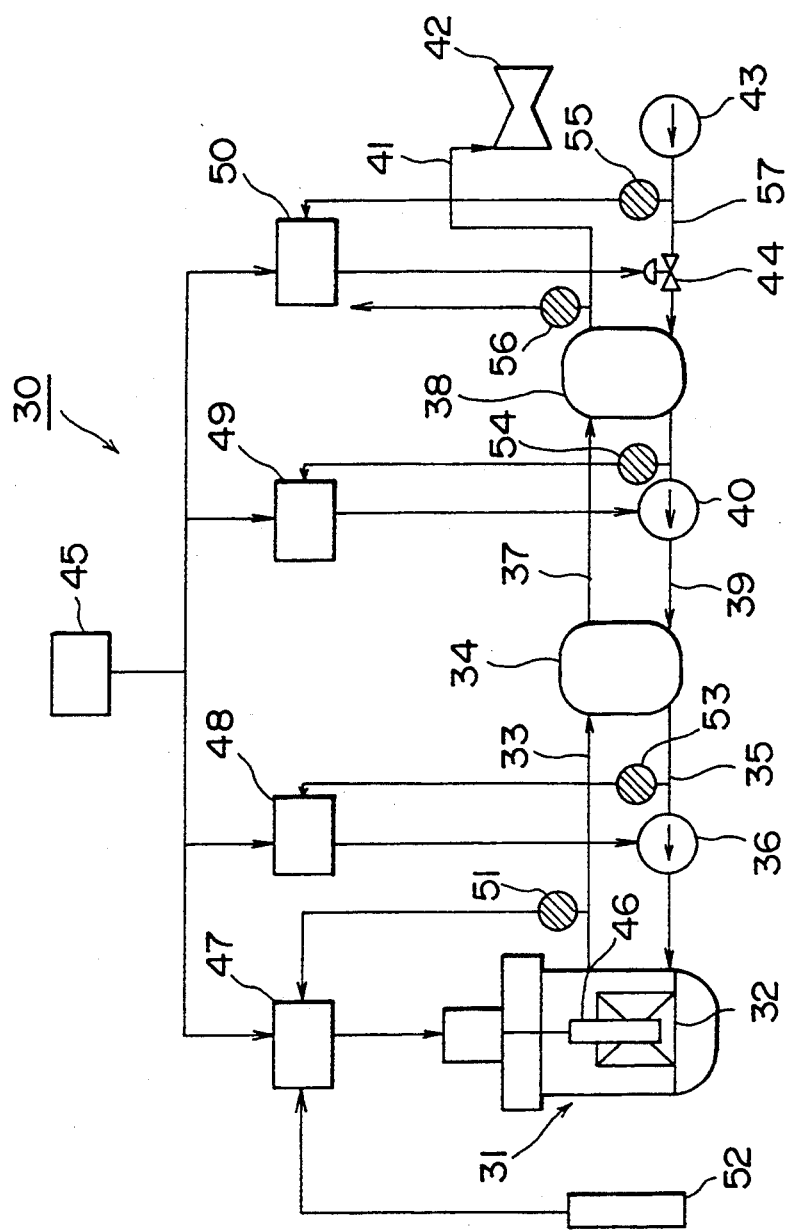
FIG. 48 shows an arrangement of a conventional nuclear power plant.

FIGS. 44 to 46 further represent another embodiment of the present invention adapted for, for example, easily performing the fuel exchanging operation per core one unit batch in comparison with the former embodiments.

Namely, referring to FIGS. 44 to 46, a fuel exchanging confinement 381 is arranged to an upper portion of a reactor chamber 325 and a rotary table 382 is disposed above the reactor chamber 325 and on the floor surface of the fuel exchanging confinement 381.

The rotary table 382 is formed with a fuel exchanging hole 382a and a hole 382b, having a diameter larger than that of the hole 382a, for withdrawing the reflector driving mechanism, and these holes are positioned to positions corresponding to the locations of the core vessels 382 for the purpose of easy fuel exchanging operation.

The fuel exchanging per core one unit batch is performed as follows.

First, the reflector driving mechanism 334 for the core objective to the fuel exchanging and the core shielding plug 331 are removed from the reactor. This removal is carried out through the reflector driving mechanism drawing-out hole 382b of the rotary table 382.

In the next step, the used fuels are drawn out one by one and the new fuels are charged also one by one in a ractor cover gas boundary defined by a guide cylinder 383, a fixed door valve 384, a fuel carrying cask 385 and a cask door valve 386.

The exchanged fuels are transferred to a fuel conveying cask 388 at which the used fuels are exchanged with the new fuels.

The conveying-in or conveying-out working of the fuel conveying cask 388 from the reactor building is performed by transferring the fuel conveying cask 388 by a gantry crane 391 with respect to a truck trailer 390 of a truck yard 389. This guntry crane 391 can be also used for conveying the fuel conveying cask 385.

In the case of conveying in or conveying out the fuel conveying cask 388, a consideration is paid not for simultaneously opening a ceiling shutter 392 and a shutter 393 of the truck yard 389 to prevent the breakage of the fuel exchanging confinement 381.

As described above, according to this embodiment, the rotary table 382 is utilized, the fuel can be easily and safely exchanged per core one unit batch in the case where a plurality of core vessels 328 are arranged in single primary coolant vessel 321.

The above the description was made to the example for performing the fuel exchanging operation in the reactor, and substantially the same will be applied to the other reactors having different structures.

What is claimed is:

1. A fast reactor comprising:

a core composed of nuclear fuel;

a core barrel surrounding an outer periphery of the core;

an annular reflector surrounding an outer periphery of the core barrel;

a partition wall structure surrounding an outer periphery of the annular reflector and supporting the core barrel by a supporting structure arranged radially of the fast reactor, said partition wall structure constituting an inner wall of a coolant passage for a primary coolant;

a neutron shield surrounding an outer periphery of the partition wall structure and disposed in the coolant passage;

a reactor vessel surrounding an outer periphery of the neutron shield and having an inner wall constituting an outer wall of the coolant passage; and a guard vessel surrounding an outer periphery of the reactor vessel.

2. A fast reactor according to claim 1, wherein said reflector is supported to be movable along an axial direction of the fast reactor and divided into a plurality of reflector sections in the radial direction of the fast reactor.

3. A fast reactor according to claim 1, wherein said neutron shield is composed of a plurality of annular columns with spaces from each other so as to pass the primary coolant therein.

4. A fast reactor according to claim 1, wherein said neutron shield is composed of an annular member having multi-wall structure with space from adjacent walls so as to pass the primary coolant therethrough.

5. A fast reactor according to claim 1, wherein an annular electromagnetic pump, an annular intermediate heat exchanger and a decay heat removal coil are arranged in series in the coolant passage and said reflector is suspended from and supported by an upper structure of the fast reactor at a portion inside the electromagnetic pump and the intermediate heat exchanger.

6. A fast reactor according to claim 5, wherein said electromagnetic pump and said intermediate heat exchanger are constructed integral with the upper structure of the fast reactor, said partition wall structure stands upwards from a lower structure of the fast reactor, and a seal bellows is disposed between a lower portion of the integral structure of the electromagnetic pump and an upper portion of the partition wall structure in an installed state of the fast reactor.

7. A fast reactor according to claim 1, further comprising an annular electromagnetic pump and an annular intermediate heat exchanger.

8. A fast reactor according to claim 1, wherein said core comprises plutonium.

9. A fast reactor according to claim 1, wherein said primary coolant comprises liquid sodium.

10. A fast reactor comprising:

core composed of nuclear fuel;

core barrel surrounding an outer periphery of said core;

an annular reflector surrounding an outer periphery of said core barrel;

a partition wall structure surrounding an outer periphery of said annular reflector and supporting said core barrel by a supporting structure arranged radially of said fast reactor, said partition wall structure constituting an inner wall of a coolant passage for a primary coolant;

a neutron shield surrounding an outer periphery of said partition wall structure and disposed in said coolant passage;

a reactor vessel surrounding an outer periphery of said neutron shield and having an inner wall constituting an outer wall of said coolant passage; and a guard vessel surrounding an outer periphery of said reactor vessel;

wherein said core is supported by a base plate disposed within said reactor vessel.

11. A fast reactor according to claim 10, wherein said reflector is supported to be movable along an axial direction of said fast reactor and divided into a plurality of reflector sections in the radial direction of said fast reactor.

12. A fast reactor according to claim 10, wherein said neutron shield comprises a plurality of annular columns with spaces from each other so as to pass the primary coolant therein.

13. A fast reactor according to claim 10, wherein said neutron shield comprises an annular member having a multi-wall structure with space from adjacent walls so as to pass the primary coolant therethrough.

14. A fast reactor according to claim 10, wherein an annular electromagnetic pump, an annular intermediate heat exchanger and a decay heat removal coil are arranged in series in said coolant passage, and wherein said reflector is suspended from and supported by an upper structure of said fast reactor at a portion inside said electromagnetic pump and said intermediate heat exchanger.

15. A fast reactor according to claim 14, wherein said electromagnetic pump and said intermediate heat exchanger are constructed integrally with the upper structure of said fast reactor, and wherein said partition wall structure stands upwards from a lower structure of said fast reactor, and a seal bellows is disposed between said lower portion of the integral structure of said electromagnetic pump and an upper portion of said partition wall structure.

16. A fast reactor comprising:

a core composed of nuclear fuel;

a core barrel surrounding an outer periphery of said core;

an annular reflector surrounding an outer periphery of said core barrel;

a partition wall structure surrounding an outer periphery of said annular reflector and supporting said core barrel by a supporting structure arranged radially of said fast reactor, said partition wall structure constituting an inner wall of a coolant passage for a primary coolant;

a neutron shield surrounding an outer periphery of said partition wall structure and disposed in said coolant passage;

a reactor vessel surrounding an outer periphery of said neutron shield and having an inner wall constituting an outer wall of said coolant passage;

a guard vessel surrounding an outer periphery of said reactor vessel; and an annular electromagnetic pump, an annular intermediate heat exchanger and a decay heat removal coil arranged in series in said coolant passage, wherein said reflector is suspended from and supported by an upper structure of said fast reactor at a portion inside said electromagnetic pump and said intermediate heat exchanger.

17. A fast reactor according to claim 16, wherein said reflector is supported to be movable along an axial direction of said fast reactor and divided into a plurality of reflector sections in the radial direction of said fast reactor.

18. A fast reactor according to claim 16, wherein said neutron shield comprises a plurality of annular columns with spaces from each other so as to pass the primary coolant therein.

19. A fast reactor according to claim 16, wherein said neutron shield comprises an annular member having a multi-wall structure with space from adjacent walls so as to pass the primary coolant therethrough.

20. A fast reactor according to claim 16, wherein said electromagnetic pump and said intermediate heat exchanger are constructed integrally with the upper structure of said fast reactor, and wherein said partition wall structure stands upwards from a lower structure of said fast reactor, and a seal bellows is disposed between said lower portion of the integral structure of said electromagnetic pump and an upper portion of said partition wall structure.

21. A fast reactor comprising:
a core composed of nuclear fuel;
a core barrel surrounding an outer periphery of said core;
an annular reflector surrounding an outer periphery of said core barrel;
a partition wall structure surrounding an outer periphery of said annular reflector and supporting said core barrel by a supporting structure arranged radially of said fast reactor, said partition wall structure constituting an inner wall of a coolant passage for a primary coolant;
a neutron shield surrounding an outer periphery of said partition wall structure and disposed in said coolant passage;
a reactor vessel surrounding an outer periphery of said neutron shield and having an inner wall constituting an outer wall of said coolant passage;
a guard vessel surrounding an outer periphery of said reactor vessel; and
an annular electromagnetic pump, an annular intermediate heat exchanger and a decay heat removal coil arranged in series in said coolant passage, wherein said reflector is suspended from and supported by an upper structure of said fast reactor at a portion inside said electromagnetic pump and said intermediate heat exchanger,
and wherein said core is supported by a base plate disposed within said rector vessel.

22. A fast reactor according to claim 21, wherein said reflector is supported to be movable along an axial direction of said fast reactor and divided into a plurality of reflector sections in the radial direction of said fast reactor.

23. A fast reactor according to claim 21, wherein said neutron shield comprises a plurality of annular columns with spaces from each other so as to pass the primary coolant therein.

24. A fast reactor according to claim 21, wherein said neutron shield comprises an annular member having a multi-wall structure with space from adjacent walls so as to pass the primary coolant therethrough.

25. A fast reactor according to claim 21, wherein said electromagnetic pump and said intermediate heat exchanger are constructed integrally with the upper structure of said fast reactor, and wherein said partition wall structure stands upwards from a lower structure of said fast reactor, and a seal bellows is disposed between said lower portion of the integral structure of said electromagnetic pump and an upper portion of said partition wall structure.

* * * * *